US012749333B2

(12) United States Patent
Vickery et al.

(10) Patent No.: US 12,749,333 B2
(45) Date of Patent: Sep. 29, 2026

(54) CAMERA BAIT STATION

(71) Applicant: Rentokil Initial 1927 plc, West Sussex (GB)

(72) Inventors: Ethan Vickery, Colleyville, TX (US); Ronen Amichai, Colleyville, TX (US); Jay Rasmussen, Colleyville, TX (US); Shmuel Seifer, Ramat HaSharon (IL)

(73) Assignee: Rentokil Initial 1927 PLC, West Sussex (GB)

( * ) Notice: Subject to any disclaimer, the term of this patent is extended or adjusted under 35 U.S.C. 154(b) by 375 days.

(21) Appl. No.: 16/947,744

(22) Filed: Aug. 14, 2020

(65) Prior Publication Data

US 2021/0056298 A1 Feb. 25, 2021

Related U.S. Application Data

(60) Provisional application No. 62/886,399, filed on Aug. 14, 2019.

(51) Int. Cl.
*G06V 20/52* (2022.01)
*A01M 23/16* (2006.01)
*G06V 40/10* (2022.01)

(52) U.S. Cl.
CPC ............ *G06V 40/10* (2022.01); *A01M 23/16* (2013.01); *G06V 20/52* (2022.01)

(58) Field of Classification Search
None
See application file for complete search history.

(56) References Cited

U.S. PATENT DOCUMENTS

| | | | |
|---|---|---|---|
| 6,445,301 | B1 | 9/2002 | Farrell et al. |
| 6,724,312 | B1 | 4/2004 | Barber et al. |
| 6,766,251 | B2 | 7/2004 | Mafra-Neto et al. |
| 6,847,892 | B2 | 1/2005 | Zhou et al. |
| 6,914,529 | B2 | 7/2005 | Barber et al. |
| 6,937,156 | B2 | 8/2005 | Gardner, Jr. et al. |
| 7,026,942 | B2 | 4/2006 | Cristofori et al. |
| 7,071,829 | B2 | 7/2006 | Gardner, Jr. et al. |
| 7,212,112 | B2 | 5/2007 | Barber et al. |
| 7,212,129 | B2 | 5/2007 | Barber et al. |

(Continued)

FOREIGN PATENT DOCUMENTS

| | | |
|---|---|---|
| EP | 1059031 | 9/2004 |
| EP | 1489904 | 3/2006 |

(Continued)

*Primary Examiner* — Samuel D Fereja
(74) *Attorney, Agent, or Firm* — Buchanan Ingersoll & Rooney PC

(57) ABSTRACT

This disclosure describes devices, systems, and methods associated with pest (e.g., rodent) management. An example of monitoring device for a pest-management station includes a camera configured to capture image data, a plurality of sensors configured to couple to a pest station. The plurality of sensors including at least one of a reed switch, a touch sensor, or a motion sensor. The monitoring device further includes a transceiver configured to wirelessly transmit data, a memory, and a processor coupled to the memory, the processor configured to activate the camera based on sensor data from one or more sensors of the plurality of sensors. Bait stations, servers, and corresponding methods are also described.

29 Claims, 22 Drawing Sheets

(56) References Cited

U.S. PATENT DOCUMENTS

| | | | |
|---|---|---|---|
| 7,262,702 B2 | 8/2007 | Barber et al. | |
| 7,286,056 B2 | 10/2007 | Kates | |
| 7,317,399 B2 | 1/2008 | Chyun | |
| 7,348,890 B2 | 3/2008 | Barber et al. | |
| 7,496,228 B2 | 2/2009 | Landwehr et al. | |
| 7,504,956 B2 | 3/2009 | Kates | |
| 7,509,770 B2 | 3/2009 | Gardner, Jr. et al. | |
| 7,656,300 B2 | 2/2010 | Rønnau | |
| 7,719,429 B2 | 5/2010 | Barber et al. | |
| 7,916,951 B2 | 3/2011 | Landwehr et al. | |
| 8,026,822 B2 | 9/2011 | Borth et al. | |
| 8,078,711 B2 | 12/2011 | Jiang et al. | |
| 8,111,155 B2 | 2/2012 | Barber et al. | |
| 8,139,858 B1 | 3/2012 | Landwehr et al. | |
| 8,156,683 B2 | 4/2012 | Slotnick | |
| 8,194,571 B2 | 6/2012 | Herrmann et al. | |
| 8,388,222 B2 | 3/2013 | Potter et al. | |
| 8,599,026 B2 | 12/2013 | Lloyd et al. | |
| 8,635,806 B2 | 1/2014 | Gardner, Jr. et al. | |
| 8,693,778 B1 | 4/2014 | Landwehr et al. | |
| 8,830,071 B2 | 9/2014 | Borth et al. | |
| 8,855,374 B2 | 10/2014 | Fryshman | |
| 8,862,393 B2 | 10/2014 | Zhou et al. | |
| 8,933,812 B2 | 1/2015 | Clifford | |
| 9,003,691 B2 | 4/2015 | Arlichson | |
| 9,015,987 B2 | 4/2015 | Moran et al. | |
| 9,179,665 B2 | 11/2015 | Frojmovics | |
| 9,332,749 B2 | 5/2016 | Cleaver | |
| 9,335,413 B2 | 5/2016 | Weber-Grabau | |
| 9,380,775 B2 | 7/2016 | Frojmovics | |
| 9,439,412 B2 | 9/2016 | Kittelson | |
| 9,542,835 B2 | 1/2017 | Borth et al. | |
| 9,585,376 B2 | 3/2017 | Park et al. | |
| 9,664,813 B2 | 5/2017 | Janét et al. | |
| 9,743,657 B2 | 8/2017 | Rich et al. | |
| 9,807,346 B2 | 10/2017 | Afanasyev et al. | |
| 9,915,732 B2 | 3/2018 | Weber-Grabau | |
| 9,999,211 B2 | 6/2018 | Janét et al. | |
| 9,999,212 B2 | 6/2018 | Janét et al. | |
| 10,045,520 B2 | 8/2018 | Carver et al. | |
| 10,085,133 B2 | 9/2018 | Borth et al. | |
| 10,111,416 B2 | 10/2018 | Rich et al. | |
| 10,152,035 B2 | 12/2018 | Reid et al. | |
| 10,261,184 B2 | 4/2019 | Weber-Grabau | |
| 10,398,316 B1 * | 9/2019 | Betts-Lacroix | A61B 5/4887 |
| 10,769,909 B1 * | 9/2020 | Modestine | G06V 20/52 |
| 2008/0204253 A1 | 8/2008 | Cottee et al. | |
| 2014/0071276 A1 | 3/2014 | Seifer et al. | |
| 2014/0085100 A1 | 3/2014 | Rich et al. | |
| 2014/0279600 A1 * | 9/2014 | Chait | G06Q 10/0631 705/317 |
| 2014/0283435 A1 | 9/2014 | Galeb | |
| 2014/0300477 A1 | 10/2014 | Rich et al. | |
| 2015/0075060 A1 | 3/2015 | Balsam | |
| 2015/0085100 A1 | 3/2015 | Raschella et al. | |
| 2015/0150236 A1 | 6/2015 | Grant | |
| 2016/0021867 A1 | 1/2016 | Frojmovics | |
| 2016/0086475 A1 | 3/2016 | Rich et al. | |
| 2016/0192635 A1 | 7/2016 | Rich et al. | |
| 2016/0219858 A1 | 8/2016 | Cink | |
| 2017/0035041 A1 | 2/2017 | Othon | |
| 2017/0035042 A1 | 2/2017 | Ben-Dashan et al. | |
| 2017/0105388 A1 | 4/2017 | Pfeiff | |
| 2017/0112116 A1 | 4/2017 | Ji et al. | |
| 2017/0195824 A1 | 7/2017 | Borth et al. | |
| 2017/0215407 A1 | 8/2017 | Pinzone et al. | |
| 2017/0223943 A1 | 8/2017 | Park et al. | |
| 2017/0238521 A1 | 8/2017 | Flint et al. | |
| 2017/0273290 A1 | 9/2017 | Jay | |
| 2017/0360026 A1 | 12/2017 | Zirkle | |
| 2018/0046872 A1 | 2/2018 | Diamond et al. | |
| 2018/0084772 A1 | 3/2018 | Peeters et al. | |
| 2018/0096581 A1 | 4/2018 | Daly et al. | |
| 2018/0121764 A1 | 5/2018 | Zha et al. | |
| 2018/0199565 A1 | 7/2018 | Zosimadis | |
| 2018/0235205 A1 | 8/2018 | Howard et al. | |
| 2018/0249696 A1 | 9/2018 | Daly et al. | |
| 2018/0260647 A1 | 9/2018 | Diamond et al. | |
| 2018/0263233 A1 | 9/2018 | Janét et al. | |
| 2018/0295831 A1 | 10/2018 | Reid et al. | |
| 2018/0301018 A1 | 10/2018 | Seifer et al. | |
| 2018/0321126 A1 * | 11/2018 | Manautou | G01N 15/1475 |
| 2019/0000059 A1 | 1/2019 | Marka et al. | |
| 2019/0110458 A1 | 4/2019 | Liu et al. | |
| 2019/0121302 A1 | 4/2019 | Reid et al. | |
| 2019/0166823 A1 | 6/2019 | Dick | |
| 2019/0187281 A1 | 6/2019 | Weber-Grabau | |
| 2019/0216076 A1 | 7/2019 | Rich et al. | |
| 2019/0223431 A1 | 7/2019 | Rustia et al. | |
| 2020/0004333 A1 * | 1/2020 | Lee | G06V 40/18 |
| 2021/0378225 A1 * | 12/2021 | Göke | A01M 1/026 |

FOREIGN PATENT DOCUMENTS

| | | |
|---|---|---|
| EP | 1350430 | 8/2007 |
| EP | 1635633 | 3/2008 |
| EP | 2149301 | 11/2013 |
| EP | 2710891 | 3/2014 |
| EP | 2323478 | 3/2017 |
| EP | 3207797 | 8/2017 |
| EP | 3119196 | 3/2018 |
| EP | 3199022 | 3/2019 |
| EP | 3466256 | 4/2019 |
| WO | WO/2015/056035 | 4/2015 |
| WO | WO/2015/185063 | 12/2015 |
| WO | WO/2016/011482 | 1/2016 |
| WO | WO/2016/073429 | 5/2016 |
| WO | WO/2016/130182 | 8/2016 |
| WO | WO/2017/116985 | 7/2017 |
| WO | WO/2017/120189 | 7/2017 |
| WO | WO/2017/165517 | 9/2017 |
| WO | WO/2017/193521 | 11/2017 |
| WO | WO/2017/208068 | 12/2017 |
| WO | WO/2017/213531 | 12/2017 |
| WO | WO/2018/017982 | 1/2018 |
| WO | WO/2018/019857 | 2/2018 |
| WO | WO/2018/031925 | 2/2018 |
| WO | WO/2018/057316 | 3/2018 |
| WO | WO/2018/063983 | 4/2018 |
| WO | WO/2018/081640 | 5/2018 |
| WO | WO/2018/161065 | 9/2018 |
| WO | WO/2018/189298 | 10/2018 |
| WO | WO/2019/020694 | 1/2019 |
| WO | WO/2019/079053 | 4/2019 |
| WO | WO/2019/079248 | 4/2019 |
| WO | WO/2019/088519 | 5/2019 |
| WO | WO/2019/120422 | 6/2019 |
| WO | WO/2019/120423 | 6/2019 |
| WO | WO/2019/138242 | 7/2019 |
| WO | WO/2019/144762 | 8/2019 |

* cited by examiner

CAMERA BAIT STATION

CROSS-REFERENCE TO RELATED APPLICATIONS

This application claims the benefit of priority to U.S. Provisional Patent Application Ser. No. 62/886,399, filed Aug. 14, 2019, hereby incorporated by reference in its entirety.

BACKGROUND

1. Field of the Disclosure

The present disclosure is generally related to devices, systems, and methods for pest (e.g., rodent) management, including bait stations having a camera.

2. Description of Related Art

Pest-management devices, such as rodent snap-traps, are designed to capture unwanted pests, such as rodents. Such devices often fail to provide an indication, independent of manual inspection by a user, that a particular device has operated. When multiple pest-management devices, such as hundreds or thousands of pest-management devices, are deployed, manual inspection of each device becomes time intensive and costly.

To address a lack of remote notification of pest-management devices, a detection and communication system can be purchased and installed to existing pest-management devices. However, such detection and communication systems can be difficult and time consuming to install. Additionally, if a detection component is not properly installed on a particular pest-management device, a user may not be remotely informed of operation of the particular pest-management device. Further, such add-on detection and communication systems typically have several wires that remain exposed to environmental conditions and to pests after installation. Exposed wires can deteriorate due to environmental conditions and can be chewed on by pests thus resulting in damage or failure of the detection and communication system.

Other attempts to address remote notification of operation of a pest-management device have included all-in-one products that include a detection and communication system are integrated in the pest-management device (e.g., bait station). Such integrated pest-management devices suffer from an increased cost of an all-in-one design and are difficult or impossible to repair if a one or more components fail. In the event of a failure of a single component, such as the detection or communication system, a user is forced to discard the entire integrated pest-management device and purchase a new device.

SUMMARY

This disclosure describes devices, systems, and methods associated with pest (e.g., rodent) management. An example of a pest-management apparatus includes a detector device having a housing, a plurality of sensors coupled to the housing, a camera coupled to the housing, a wireless communication interface, and circuitry disposed within a cavity of the housing. The camera is configured to be activated in response to sensor data from one or more of the plurality of sensors and/or remote image capture requests. In some implementations, the detector device has artificial intelligence (AI) based image detection software. In some implementations, the detector device has no exposed wires outside of the housing. The detector device is configured to be coupled to a pest-management device (e.g., bait station). The pest-management device may include a trap, such as a rodent snap-trap. The circuitry is configured to detect operation of the trap based on one or more sensors of the plurality of sensors. In response to detection of the operation of the trap, the circuitry may capture an image, initiate transmission (e.g., wired and/or wireless transmission) of a notification, or both.

Another example of a pest-management apparatus includes bait station that is configured to provide an electrical path to a detector device without using wires in an area where the wires may be accessible to a pest. Thus, the wires may be less prone to damage, such as from the pest chewing on or pulling on the wires.

The above-described aspects include the benefit of increased speed and ease of deployment of a pest-management apparatus and a reduction in time and manpower to identify pest-management apparatuses that have operated. To illustrate, components and devices of the pest-management apparatus are configured to be removably coupled from each other and, when coupled, enable proper function and interaction between different components. In this manner, the present disclosure provides a pest-management system with "plug and play" components that provide a high degree of user customization. For example, a user may easily arrange one or more components to form a multi-trap pest-management apparatus that includes individual trap operation detection as well as remote notification of individual trap operation. Furthermore, the above-described aspects provide components that can be combined with a variety of other components to enable a user to achieve different pest-management device configurations. Additionally, the above-described aspects provide a pest-management apparatus, such as a bait station, that includes components or devices that can repaired or replaced without having to discard the entire pest-management apparatus resulting in cost saving. Additionally, the above-described aspects include a pest-management apparatus with no exposed wires that can be chewed on and damaged by a pest.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any aspect of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

Some details associated with the aspects of the present disclosure are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures. Views identified as schematics are not drawn to scale.

DETAILED DESCRIPTION OF ILLUSTRATIVE EMBODIMENTS

Figure 1:
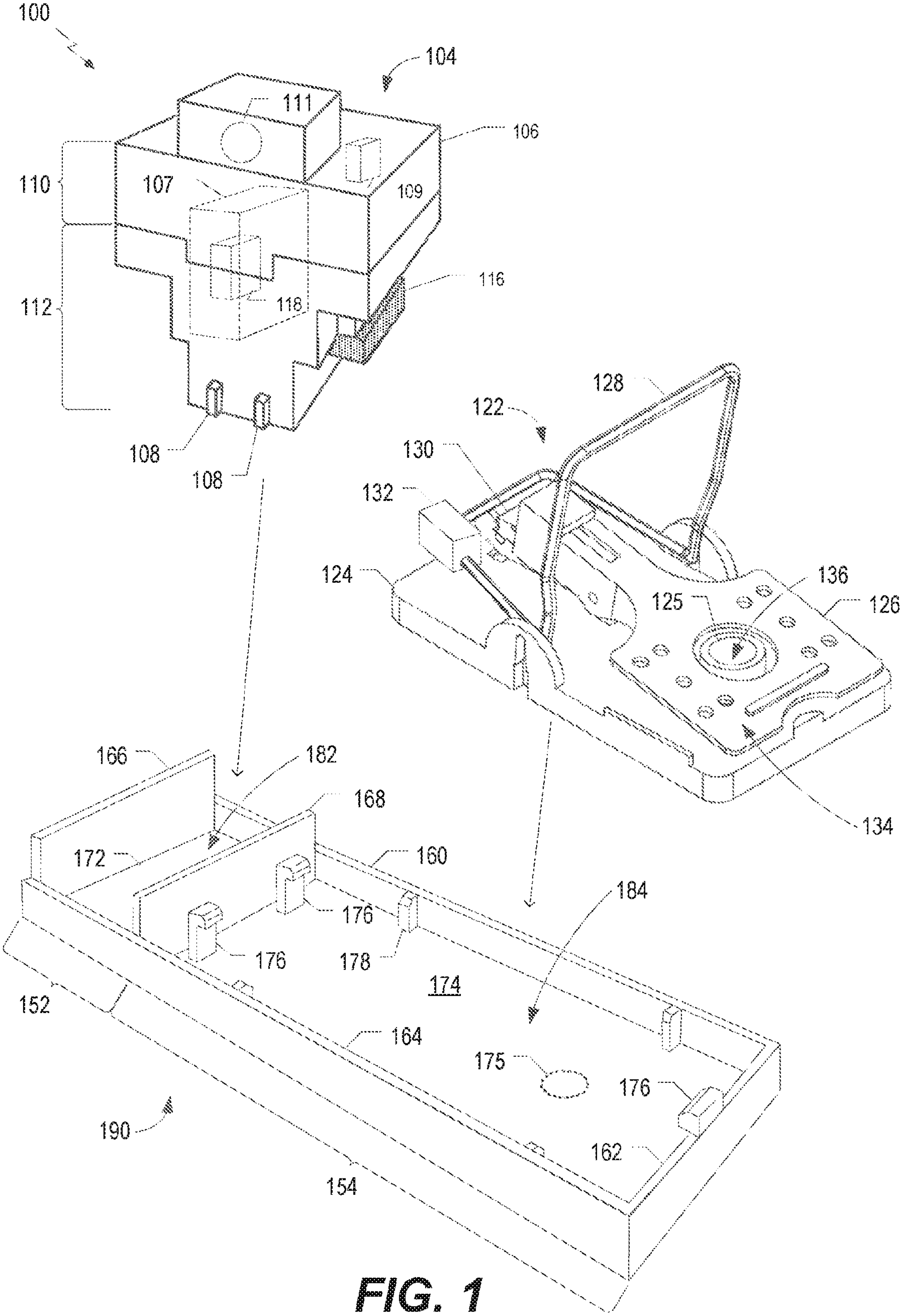
FIG. 1 is a diagram that that illustrates an isometric view of an example of a pest-management system including a camera.

Referring now to the figures, and more particularly to FIG. 1, an isometric view of an example 100 of a pest-management apparatus (e.g., a pest-management device of a pest-management system) is depicted. Example 100 includes a detector device 104, a trap 122 (e.g., a snap-trap), and a platform 190. Platform 190 is configured to be removably couplable to each of detector device 104 and trap 122, as described further herein.

Detector device 104 (e.g., a monitoring system) includes a camera 111, a switch 116 (e.g., a sense switch), circuitry 118, and a housing 106 that defines a cavity 107. In some implementations, detector device 104 may also include a switch 109 (e.g., an activation switch). The housing 106 includes a first portion 110 and a second portion 112. First portion 110 is removably coupled to second portion 112 such that first portion 110 and second portion 112 cooperate to define cavity 107. In some implementations, first portion 110 and second portion 112 may be configured to be coupled via one or more fasteners, such as a screw, a clip, or a combination thereof, as illustrative, non-limiting examples. Second portion 112 includes one or more protrusions 108. The one or more protrusions 108 are configured to stabilize or secure detector device 104 when detector device 104 is coupled to platform 190, trap 122, etc. In some implementations, housing 106 does not include the one or more protrusions 108.

Switch 109 includes an activation switch, such as a toggle switch, push button, a slide switch, or a rotary switch, as illustrative, non-limiting examples. Switch 109 is coupled (e.g., electrically coupled) to circuitry 118 and is configured to activate and/or deactivate circuitry 118 to perform one or more operations, as described herein. Additionally, or alternatively, switch 109 may be configured for use in programming and/or configuring detector device 104. In some implementations, switch 109 may be positioned within cavity 107. In some such implementations, switch 109 may be accessible and/or visible via an opening of the housing 106 when first portion 110 is coupled to second portion 112. For example, when first portion 110 is coupled to second portion 112, the opening may be defined by first portion 110, second portion 112, or a combination of first portion 110 and second portion 112. In other implementations, switch 109 may be coupled to or integrated in housing.

Camera 111 includes one or more image sensors (e.g., a charge coupled device (CCD) and is configured to capture image data. Camera 111 may include or correspond to a digital camera or a digital video camera in some implementations. Camera 111 is configured to capture an image, generate image data, responsive to one or more different indications and/or conditions. For example, in some implementations, camera 111 is configured to capture an image, generate image data, responsive to one or more indications generated based on sensor data from one or more sensors of the detector device 104 or coupled to the detector device 104. Additionally, or alternatively, camera 111 is configured to capture an image responsive to receiving an image capture command, such as from an input button (e.g., switch 109) on the housing 106, or from a remote device (e.g., 552 or 554). In some such implementations, the camera 111 may be configured to operate in one or more modes, such as an on demand mode, a timer mode, a request mode, or a combination thereof. Additional details on the camera 111 and the operations thereof, are described further with reference to FIGS. 6 and 7. In some implementation, camera 111 is configured to capture multiple images in succession. In some such implementations, camera 111 may include or correspond to a video camera.

Switch 116 includes a magnetic switch, such as a reed switch, as an illustrative, non-limiting example. Switch 116 includes an operational region bounded by a portion of switch 116, as described further herein with reference to FIG. 5. Switch 116 is configured to operate responsive to a magnetic field, such as a magnetic field generated by a magnet (e.g., a permanent magnet or an electromagnet) or a another device. To illustrate, an operational region of switch 116, such as a reed switch, is configured such that magnet 132 (coupled to trap 122) having a designated magnetic field strength can operate switch 116 when magnet 132 is within a threshold distance to the operational region. For example, when magnet 132 is within the threshold distance and switch 116 receives the designated magnetic field strength of the magnet field, switch 116 is in or transitions to an electrically conductive state (i.e., an on state or a closed state). When magnet 132 is not within the threshold distance and switch 116 does not receive the designated magnetic field strength of the magnet field, switch 116 is in or transitions to a non-electrically conductive state (i.e., an off state or an open state).

As shown, switch 116 is physically coupled to housing 106. In other implementations, switch 116 is integrated in housing 106 (e.g., integrated in first portion 110, second portion 112, or both), or is included within housing 106, such as within cavity 107. In some implementations, switch 116 is removably coupled to housing 106. For example, an electrical connection (e.g., a port) can be incorporated into housing 106, and switch 116 can be physically coupled to housing 106 via the port.

Circuitry 118 is disposed in cavity 107 and is electrically coupled to switch 116. Circuitry 118 is configured to detect operation of trap 122 responsive to an operation of magnetic switch 116. For example, in a particular implementation, circuitry 118 is configured to detect operation of trap 122 responsive to an operation in which switch 116 transitions from an active state to a deactivated state. Alternatively, in another particular implementation, circuitry 118 is configured to detect operation of trap 122 responsive to an operation in which switch 116 transitions from a deactivated state to an active state.

Figure 4:
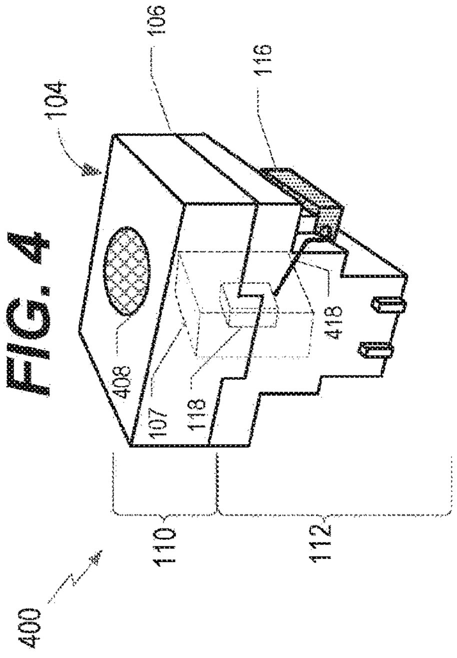
FIG. 4 is a diagram that illustrates an isometric view of a first example of a monitoring system for a pest-management system.
Figure 5:
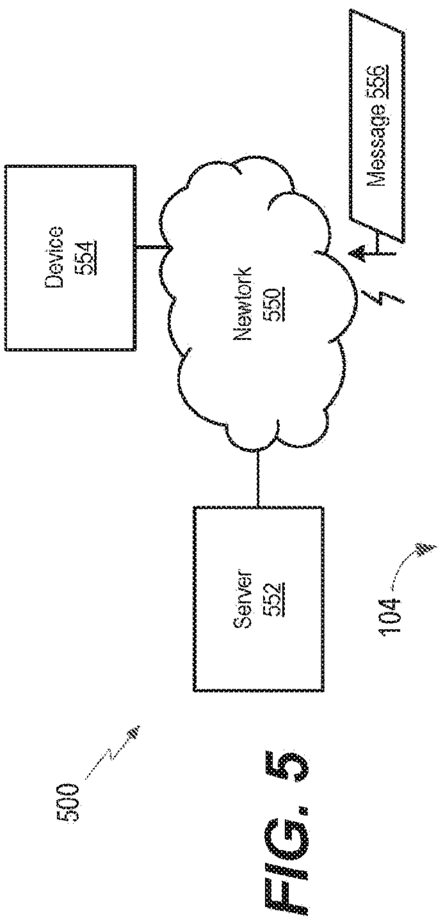
FIG. 5 is a block diagram that illustrates aspects of an illustrative pest-management system including a camera.
Figure 5:
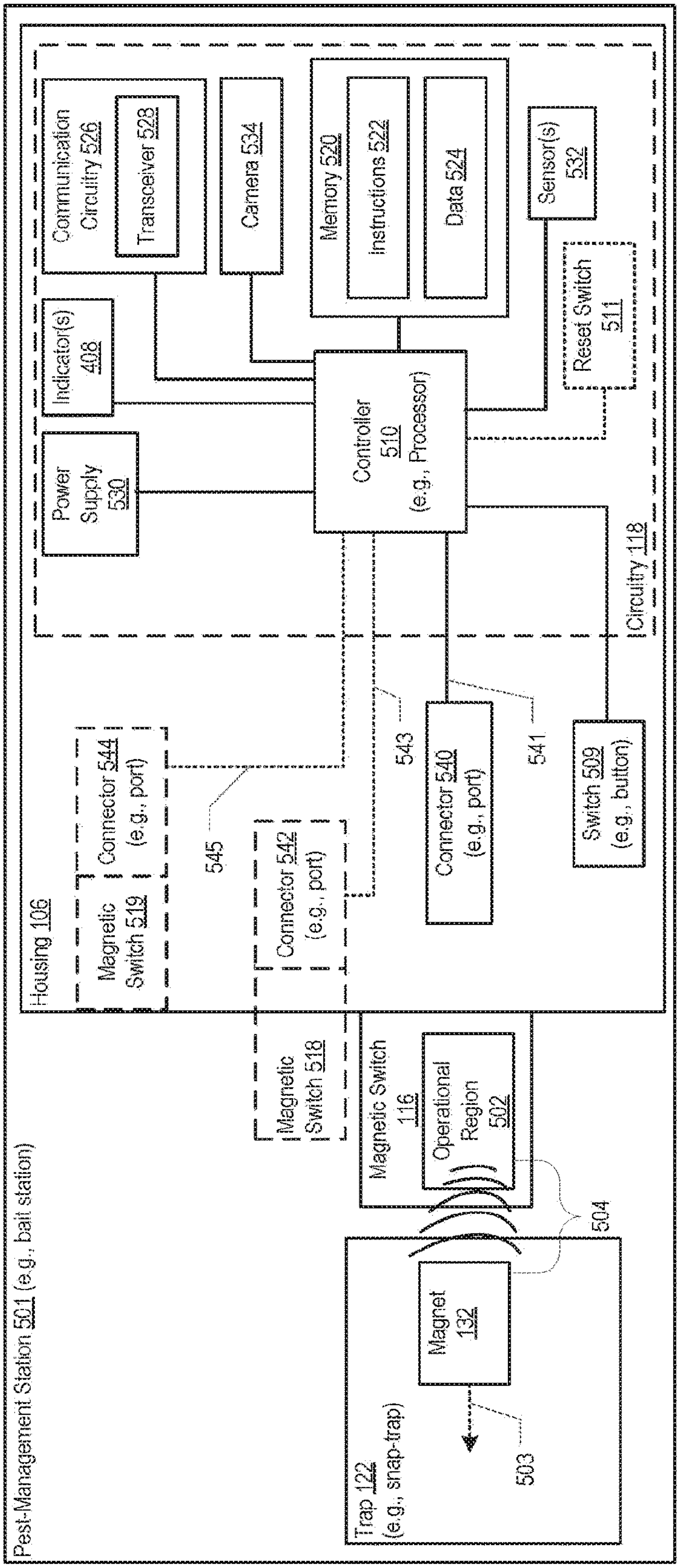

Circuitry 118 may be connected to switch 116 by an electrical wire, as described further herein with reference FIGS. 4-5. In some implementations in which switch 116 is coupled to circuitry 118 by an electrical wire (e.g., a wire conductor), the electrical wire is inaccessible from outside housing 106 when switch 116 is physically coupled to housing 106.

Trap 122, such as a snap-trap (e.g., a rodent snap-trap), includes a base 124, a capture element 128 (e.g., a hammer, a bar, a jaw, etc.), a trigger 126, a latch 130 (e.g., a release catch), and a magnet 132. In some implementations, base 124 includes an opening 125 that defines a channel 136. It is noted that in other implementations, base 124 may not include the opening 125 that defines channel 136 Capture element 128, also referred to herein as a capture bar, is pivotally coupled to base 124 such that a portion of capture element 128 is biased toward a capture portion 134 of base 124. Capture element 128 may be biased toward the capture position via a biasing member (not shown), such as, for example, a spring.

As shown, capture element 128 is in a set position in which capture element 128 is held in position by latch 130. For example, capture element 128 is configured to be pivoted away from the capture portion 134 to the set position in which the portion of capture element 128, upon release (by latch 130) of capture element 128 from the set position, travels toward capture portion 134. To illustrate, latch 130 is configured to retain capture element 128 in the set position such that movement of trigger 126 may cause latch 130 to release, thereby enabling movement of capture element 128 toward capture portion 134. In other implementations, trap 122 include an electric trap, an adhesive mat, or another a pest-capture device. Base 124 of trap 122 is configured to be coupled to housing 106 such that, upon the release of capture element 128 from the set position, the magnetic field (of magnet 132) causes an operation of magnetic switch 116. For example, base 124 is configured to be coupled to housing 106 via platform 190 (as described further herein with reference to at least FIGS. 1 and 3). With respect to housing 106 being directly coupled to platform 190, in a particular implementation, detector device 104 (e.g., housing 106) includes one or more brackets, as described with reference to FIGS. 9A-9F and FIGS. 15-18, that are configured to engage platform 190, such that detector device 104 is directly, and removably, coupled to platform 190.

Figure 2:
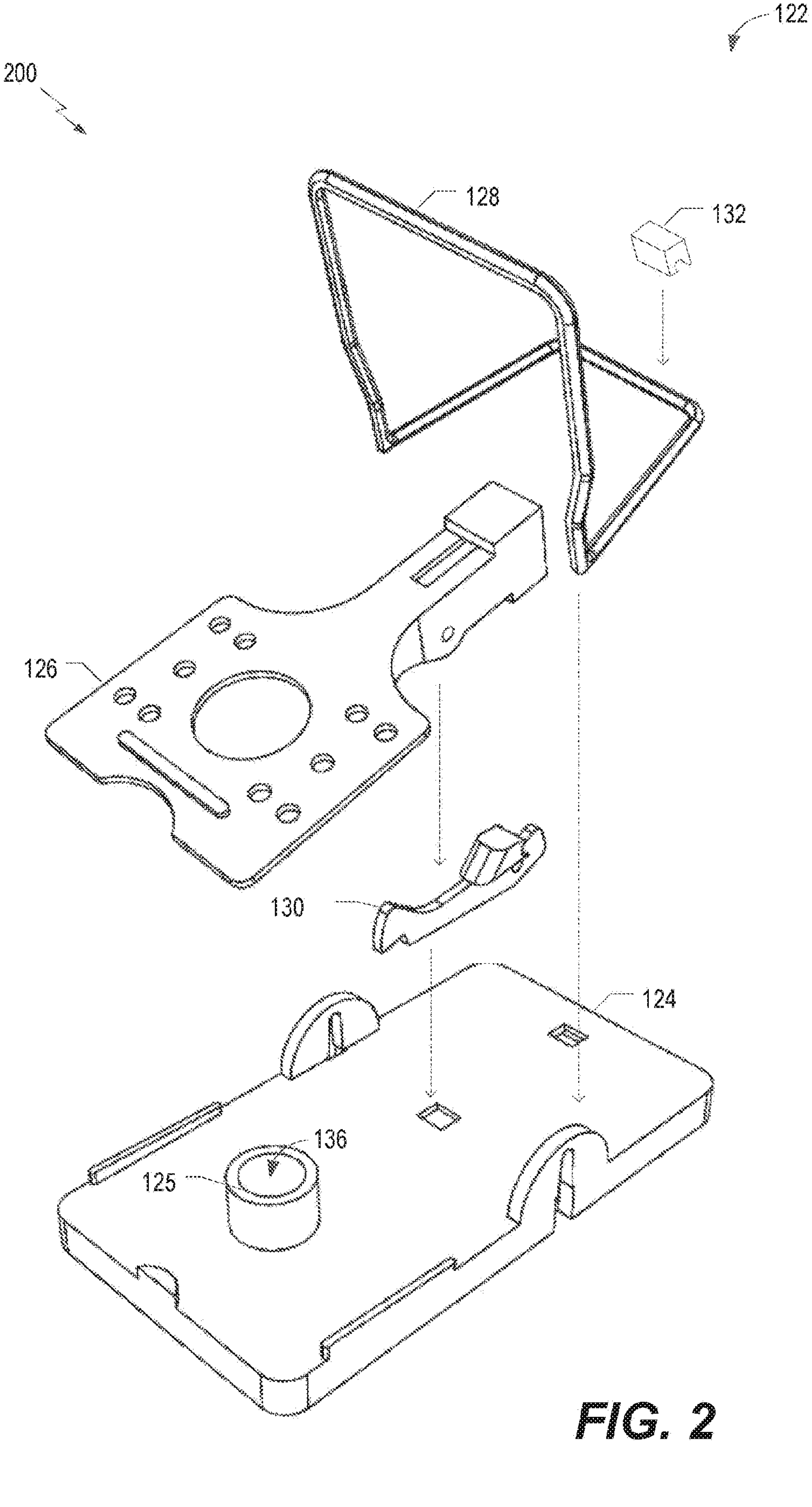
FIG. 2 is an assembly drawing of a trap of the pest-management system of FIG. 1.

Referring to FIG. 2, an assembly drawing of an example of trap 122 is depicted and generally designated 200. Magnet 132 is coupled to capture element 128. For example, magnet 132 may be directly coupled to capture element 128 (e.g., in direct physical contact), may be coupled to capture element 128 via an attachment means, such as an adhesive or the like, or may be included in a holder that configured to be coupled to capture element 128. Although magnet 132 is described herein as being coupled to capture element 128, in other implementations, magnet 132 may be include (e.g., incorporated) in capture element 128 such that at least a portion of capture element 128 is magnetic and generates a magnetic field. Capture element 128 is pivotably coupled to base 124. Trigger 126 is coupled to latch 130 and latch 130 is coupled to base 124. As shown, base 124 includes opening 125 that defines channel 136 through which a screw or other device (e.g., one or more fasteners) may be inserted to anchor trap 122. It is noted that in other implementations, base 124 may not include opening 125 that defines channel 136 and, additionally or alternatively, trap 122 may be secured or otherwise anchored in another manner, such as an adhesive, as an illustrative, non-limiting example. It is also noted that one or more components (e.g., a spring, a pin, a rivet, etc.) of trap 122 have been omitted from FIG. 2 for ease of illustration and that FIG. 2 is not to be considered limiting with respect to trap 122.

Referring to FIG. 1, platform 190 is configured to be removably coupled to base 124 of trap 122 and detector device 104. For example, platform 190 is configured to be concurrently coupled to base 124 and detector device 104 such that operation of the portion of the capture element 128 from the set position toward the capture portion 134 of the trap 122 changes a state of the switch 116 (the change in state of switch 116 detectable by circuitry 118).

Platform 190 includes a layer having a surface 172, 174, walls 160, 162, 164, 166, 168, one or more brackets 176 (e.g., clips or retention features), and one or more protrusions 178. Brackets 176 are configured to retain trap 122 in a coupled position with respect to platform 190 and protrusions 178 are configured to stabilize and position trap 122 with respect to platform 190. Additionally, an angled surface of protrusions 178 may configured to facilitate (e.g., guide) the trap 122 into being coupled with the platform 190. Although described as having one or more brackets 176, in other implementations, platform 190 may not include the one or more brackets.

In some implementations, platform 190 may include one or more through holes, such as a representative through hole 175. Through hole 175 may be configured to align with opening 125 such that a screw or other device (e.g., one or more fasteners) may be inserted to anchor trap 122 to platform 190. In other implementations, trap 122 and/or platform 190 may be secured or otherwise anchored in another manner, such as a screw, an adhesive, a tie (e.g., a zip tie), a strap, or a combination thereof, as an illustrative, non-limiting examples. To illustrate, trap 122 and/or platform 190 may include one or more openings to enable trap and/or platform 190 to be secured or otherwise anchored to a floor, trap box, or pipe using a tie or screw. Additionally, or alternatively, it is noted that a holder and/or housing 106 may also include one or more openings to enable the holder, housing 106, trap 122, and/or platform 190 to be secured or otherwise anchored.

Platform includes a first portion 152 associated with detector device 104 and a second portion 154 associated with trap 122. For example, first portion 152 corresponds to a region 182 defined by surface 172 and at least a portion of walls 160, 164, 166, 168. The detector device 104 is removably coupled to platform via region 182. Second portion corresponds to a region 184 defined by surface 174, at least a portion of walls 160, 162, 164, 168, one or more brackets 176, one or more protrusions 178, or a combination thereof. Although platform 190 is described as being removably couplable to each of detector device 104 and trap 122, in other implementations, platform 190 is removably couplable to one of detector device 104 or trap 122, but not to the other. For example, in a particular implementation, detector device 104 is integrated in platform 190 and trap 122 is removably couplable with platform 190. In another particular implementation, trap 122 is integrated in platform 190 and detector device 104 is removably couplable with platform 190.

In some implementations, a portion of one or more of walls 160, 162, 164, 166, 168 may be omitted. For example, in a particular implementation, a portion of wall 164 corresponding to second portion 154 may be omitted. Additionally, or alternatively, an entirety of wall 162 may be omitted.

During operation, each of detector device 104 and trap 122 is coupled to platform 190. For example, detector device 104 is coupled to first portion 152 of platform 190 via region 182 and trap 122 is coupled to second portion 154 of platform 190 via region 184. Detector device 104 is activated (e.g., turned on) via switch 109. Capture element 128 is configured in the set position such that a magnetic field of magnet 132 causes switch 116 to be in an active state. In response to trigger 126 being operated, such as by a rodent applying a force to trigger 126, latch 130 releases capture element 128 from the set position. Capture element 128 (including magnet 132) travels towards capture portion 134, also referred to herein as a capture zone. As magnet 132 travels with capture element 128, a strength of a magnetic field (of magnet 132) received by switch 116 dissipates and switch 116 transitions from the active state to a deactivated state in response to a received magnetic field strength being less than an operating characteristic of switch 116. Circuitry 118 detects the change in state of switch 116 indicating operation of the trap 122. Operation of the trap 122 (e.g., changing of the state of the switch 116) may trigger activation of camera 111. To illustrate, after activation of trap 122, camera 111 captures an image to determine if a pest was actually captured. The image (image date) can be transmitted to an external device for review. Accordingly, the trap 122 can be monitored remotely. In a particular implementation, the trap 122 may be reset or rearmed remotely as well.

As shown, platform 190 is a single structure. Alternatively, platform 190 may include multiple structures. For example, first portion 152 (e.g., cavity) may include or correspond to a covering or a holder, such as a covering or a holder as described at least with reference to at least FIGS. 15 and 16, that is coupled to platform 190, which further includes or corresponds to the second portion 154 (e.g., cavity 1308), as described with reference to at least FIGS. 13-16. To illustrate, platform 190 may be configured to be removably coupled to a holder that is configured to be coupled to detector device 104. Accordingly, that platform 190 can be configured to be coupled to detector device 104 via the holder.

In an implementation of an aspect of a pest-management apparatus (e.g., a pest-management system), a monitoring system, such as detector device 104, for trap 122 includes housing 106 that defines cavity 107, switch 116 physically coupled to housing 106, and circuitry 118 disposed in cavity 107 and electrically couplable to switch 116. Switch 116 has an operational region bounded by a portion of the switch 116 and configured to operate responsive to a magnetic field of magnet 132. To illustrate, housing 106 is configured to be coupled to base 124 of trap 122 such that, upon the release of capture element 128 from the set position, the magnetic field causes the operation of switch 116. Housing 106 is configured to be coupled to trap 122 directly or via platform 190 that is configured to be coupled to housing 106 and to be coupled to base 124 of trap 122. Circuitry 118 is configured to detect operation of the trap 122 responsive to an operation of switch 116. Circuitry 118 includes one or more components selected from the group of components consisting of a power supply, a processor, a memory, communication circuitry, a transmitter, a sensor device, and an indicator device (e.g., one or more light emitting diodes, an audio speaker, a display device, or a combination thereof). In some implementations of the pest-management apparatus, the pest-management apparatus includes one or more components selected from the group of components consisting of trap 122, detector device 104, and a holder that includes at least one bracket configured to maintain detector device 104 within a cavity defined by the holder.

Thus, FIG. 1 describes a pest-management apparatus that provides increased speed and ease of deployment and a reduction in time and manpower for identification of an operated pest-management apparatus. To illustrate, components and devices of the pest-management apparatus are configured to be removably coupled from each other and, when coupled, enable proper function and interaction between different components. In this manner, the present disclosure provides a pest-management system with "plug and play" components that are individually replaceable in a case of a failure. Additionally, the above-described aspects include a pest-management apparatus with no exposed wires that can degrade or deteriorate because of environmental conditions or that can be chewed on and damaged by a pest.

Figure 3:
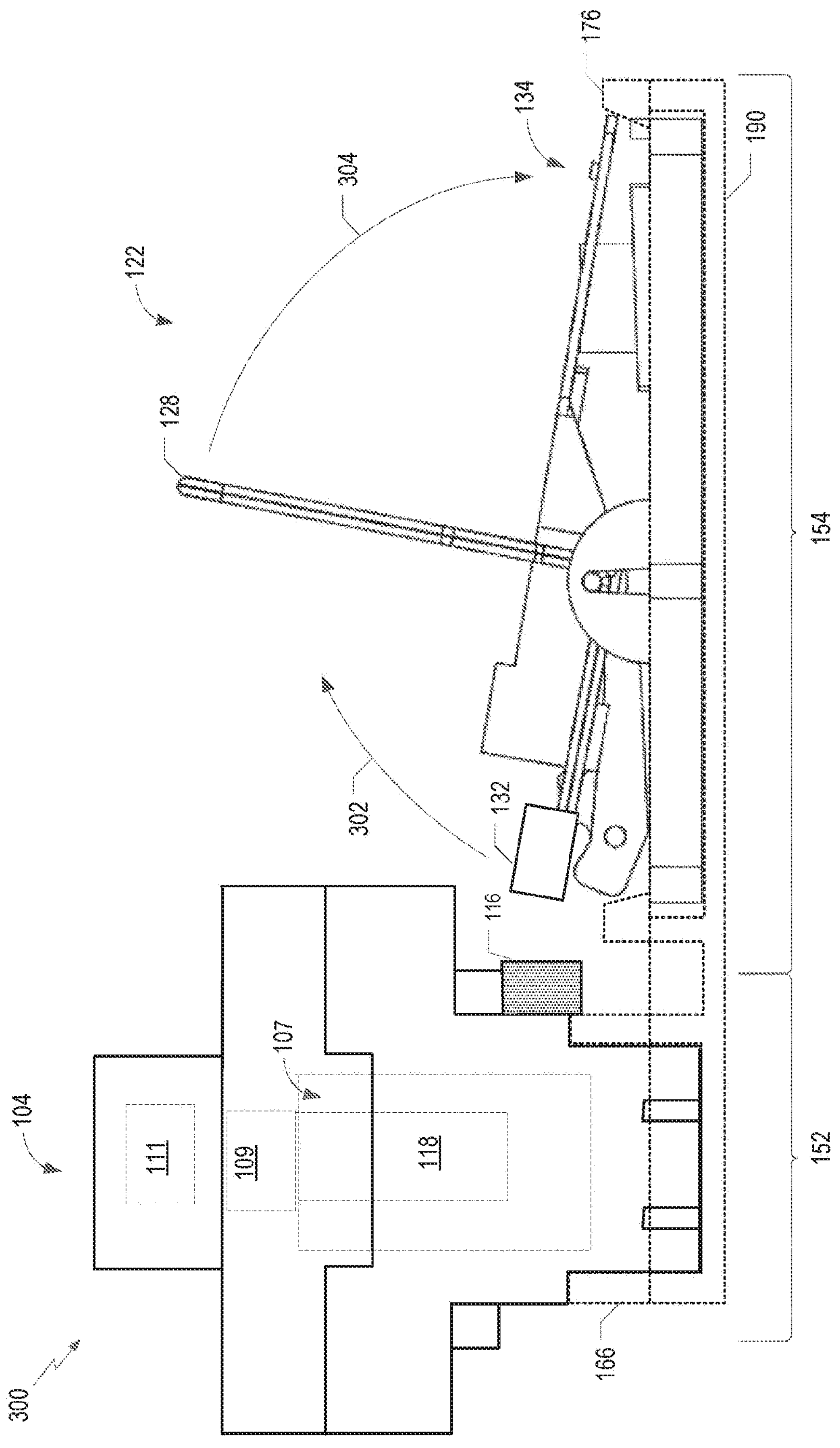
FIG. 3 is a diagram of the pest-management system of FIG. 1.

Referring to FIG. 3, a diagram of an example 300 of a pest-management apparatus (e.g., a pest-management system) is depicted that includes detector device 104 coupled to trap 122 via platform 190. In example 300, platform 190 is represented by dotted lines for clarity of illustration and to show coupling of trap 122 and platform 190 by brackets 176.

As shown, trap 122 is configured such that capture element 128 is in the set position. Capture element 128 is pivotally coupled to base 124 such that a portion of capture element 128 is biased toward capture portion 134 of base 124. To configure capture element 128 in the set position, capture element 128 is configured to be pivoted away (opposite the direction indicated by arrows 302, 304) from the capture portion 134 to the set position. Upon release of capture element 128 from the set position, capture element 128 travels toward capture portion 134 in the direction indicated by arrows 302, 304. To illustrate, when detector device 104 and trap 122 are coupled to platform 190, release of capture element 128 from the set position causes magnet 132 to travel such that a magnetic field of magnet 132 is removed from an operational region bounded by a portion of the switch 116, thus causing switch 116 to experience a state transition. For example, operation of the portion of capture element 128 from the set position toward capture portion 134 of trap 122 changes the state of the switch 116 from an open state to a closed state, or from a closed state to an open state. Operation of the trap 122 (e.g., changing of the state of the switch 116) may trigger activation of camera 111. To illustrate, after activation of trap 122, camera 111 captures an image to determine if a pest was actually captured. Thus, FIG. 3 describes a pest-management apparatus that provides the same or similar advantages as identified above with reference to FIG. 1.

Referring to FIG. 4, a perspective view of an example 400 of detector device 104 (e.g., a monitoring system) for a pest-management system is depicted. As shown, an electrical wire 418 is connected to switch 116 and to circuitry 118. Accordingly, electrical wire 418 electrically couples switch 116 and circuitry 118. In other implementations, electrical wire 418 may be replaced by, or used in conjunction with, a connector, a conductive bar, or a port, as illustrative, non-limiting examples.

In example 400, detector device 104 includes an indicator device 408. Indicator device 408 is configured to indicate (e.g., visually indicate) a state of trap 122 to a user. For example, indicator device 408 may indicate whether trap 122 is in the set position or has been tripped (e.g., actuated). As shown, indicator device 408 is incorporated into housing 106. Indicator device 408 is coupled to circuitry 118 (not shown). Indicator device 408 includes a light emitting diode (LED), an audio speaker, a display device, or a combination thereof. In an implementation where indicator device 408 includes the LED, the LED may change in color, intensity, blinking frequency, or a combination thereof, in response to detection by circuitry 118 of an operation of trap 122.

Additionally, or alternatively, indicator device 408 may include or be coupled to switch 109. For example, indicator device 408 may provide an indication in response to switch 109 being operated to activate circuitry 118. In some implementations, indicator device 408 may be configured to provide one or more indications as part of a configuration routine of device 104. For example, indicator device 408 may be configured to provide a first set of one or more indications responsive to device 104 being activated, a second set of one or more indications responsive to device 104 being wirelessly coupled to another device, and/or a third set of one or more indications in response to detection of operation of trap 122, as illustrative, non-limiting examples.

Thus, FIG. 4 describes a monitoring system of a pest-management apparatus that provides increased speed and ease of deployment and a reduction in time and manpower for identification of an operated pest-management apparatus. To illustrate, the monitoring system (e.g., the detector device 104) can be quickly coupled to other components by a user to easily enable proper function and interaction between different components. In this manner, the present disclosure provides a pest-management system with a "plug and play" component that is individually replaceable in a case of a failure without having to discard an entirety of a pest-management system.

Referring to FIG. 5, a block diagram of an example 500 of an illustrative pest-management system is depicted that a pest-management station 501, a network 550, a server 552, and a device 554. Pest-management station 501 includes trap 122 and detector device 104 having housing 106. Detector device 104 is wirelessly coupled to the network 550. Network 550 is coupled to the server 552 and/or the device 554 (e.g., an electronic device, such as a computer, mobile device, smart phone, etc.) via a wired connection, a wireless connection, or both. Each of server 552 and device 554 may include a memory storing one or more instructions, and a processor coupled to the memory and configured to execute the one or more instructions to perform corresponding operations as described herein. For example, device 554 may include one or more instructions (e.g., software), such as a mobile application, to enable device 554 to configure detector device 104.

Trap 122 includes magnet 132 configured to generate a magnetic field 504. As described above, magnet 132 may be coupled to or included in capture element 128 and may travel as indicated by dashed arrow 503.

Detector device 104 may include one or more switches (e.g., one or more magnetic switches), such as switch 116, a second switch 518, and a third switch 519, each of which is coupled to housing 106. As shown, switch 116 is physically coupled to an exterior of housing 106, second switch 518 is integrated in housing 106, and third switch 518 is within housing 106 (e.g., within cavity 107 of housing 106). Each of the switches 116, 518, 519 may be configured to be selectively, magnetically coupled to a corresponding trap 122. Although example 500 shows detector device 104 having three switches, in other implementations, detector device 104 can include more than three switches or fewer than three switches.

Switch 116 may be considered representative of each of switches 518, 519. Switch 116 includes an operational region 502 bounded by a portion of the switch 116 and configured to operate responsive to magnetic field 504 of magnet 132. In a particular implementation, switch 116 includes a reed switch. Operational region 502 is configured such that magnet 132 having a designated magnetic field strength can operate switch 116 when magnet 132 is within a threshold distance to operational region 502. To illustrate, when magnet 132 is within the threshold distance and switch 116 receives the designated magnetic field strength of magnet field 504, switch 116 is in, or transitions to, an electrically conductive state. When magnet 132 is not within the threshold distance and switch 116 does not receive the designated magnetic field strength of magnet field 504, switch 116 is in, or transitions to, a non-electrically conductive state.

In a particular implementation, switch 116 is in an active state responsive to magnetic field 504 when capture element 128 of trap 122 is in the set position. Upon release of capture element 128, magnet 132 travels (with capture element 128) and switch 116 transitions to an inactive state as a strength of magnetic field 504 experienced by switch 116 dissipates. In another particular implementation, switch 116 is in an inactive state when capture element 128 of trap 122 is in the set position. Upon release of capture element 128, magnet 132 travels (with capture element 128) such that magnetic field 504 traverses operational region 502 with the designated magnetic field strength to activate switch 116. As capture element 128 continues to travel with magnet 132, switch 116 transitions to an inactive state as a strength of magnetic field 504 experience by switch 116 dissipates. Accordingly, operation of trap 122 may temporarily activate switch 116 such that circuitry 118 may detect operation of trap 122 based on the temporary activation of switch 116. To illustrate, circuitry 118 may apply a voltage to switch 116 and measure a current through switch 116 to determine whether switch 116 is in an open state or a closed state.

As shown, switch 116 is coupled to circuitry 118 via connector 540 and an electrical wire 541, such as electrical wire 418 of FIG. 4. In some implementations, connector 540 (e.g., a port) is incorporated into housing 106 such that switch 116 is physically coupled to housing 106 via connector 540 (e.g., an electrical connection terminal), and magnetic switch 116 is removably coupled to the housing.

Likewise, second switch 518 is coupled to circuitry 118 via connector 542 and wire 543, and third switch 519 is coupled to circuitry via connector 544 and wire 545. Alternatively, switch 116 may be coupled to circuitry 118 via connector 540 and not electrical wire 541, or via electrical wire 541 and not connector 540. Similarly, second and third switches 518, 519 may be coupled to circuitry 118 via a corresponding connector, a corresponding wire, or both.

Detector device 104 may also include a switch 509, such as activation switch and/or a control switch. For example, switch 509 may include or correspond to switch 109. Switch 509 is coupled to circuitry 118 and configured to activate one or more components of circuitry 118, initiate one or more operations by circuitry 118, or a combination thereof.

As shown, circuitry 118 includes one or more components, such as controller 510, memory 520, one or more indicator devices 408, power supply 530, one or more sensors 532, a camera 534, and/or communication circuitry 526. In some implementations, circuitry 118 may include more components or fewer components. For example, circuitry 118 may not include the one or more sensors 532. As another example, in some implementations, circuitry 118 includes one or more components selected from the group of components consisting of power supply 530, controller 510 (e.g., a processor), memory 520, communication circuitry 526, a transmitter, a sensor 532, a camera 534, and an indicator device 408. In some implementations, circuitry 118 may include switch 116 and/or switch 509. Additionally, or alternatively, detector device 104 may include a reset switch 511. Reset switch 511 may be configured to reset detector device 104 or trap 122 to a default configuration.

Memory 520 is configured to store instructions 522 and/or data 524. Instructions 522 may be executable by controller 510 (e.g., a processor) that is coupled to memory 520 and to switch(es) 116, 518, 519. For example, controller 510 may be configured to execute the instructions to perform one or more operations, such as described further herein with reference to FIG. 21-24. Data 524 may include information about detector device 104, such as a device identifier (ID), location information of detector device 104, or one or more thresholds, such as a timer threshold, a power threshold, or a sensor value threshold, as illustrative, non-limiting examples.

Communication circuitry 526 includes a transceiver 528 and is configured to generate notifications or messages, such as representative message 556, for wireless communication. Although communication circuitry 526 is described as including transceiver 528, in other implementations, communication circuitry 526 includes a transmitter but not a receiver. Additionally, or alternatively, communication circuitry 526 may include one or more interfaces to enable detector device 104 to be coupled (via a wired connection and/or a wireless connection) to another device. Power supply 530 includes a battery, such as a rechargeable battery, or other power source. Sensor(s) 532 include one or more sensors, such as a moisture sensor, a heat sensor, a vibration sensor, a power sensor, etc.

Sensors 532 may also include touch sensors, field sensors, motion sensors, the magnetic switches 116, 518, and 519 (e.g., reed sensors) illustrated in FIG. 5, etc., or a combination thereof. As illustrative, non-limiting examples, passive infrared (PIR) sensors, active infrared sensors, or both, may be used as motion sensors. Sensors 532 generate sensor data. The sensor data may indicate a status of trap 122, whether to activate trap 122, whether to activate camera 534, or a combination thereof.

In some implementations, sensors 532 or magnetic switches 116, 518, and 519 (e.g., reed sensors) are configured to generate sensor data (e.g., 730) indicative of a status of a door or point of entry to a building or monitored area. For example, the detector device 104 may include a sensor configured to sense a state of a door or a change in a state of a door (or other entry point). To illustrate, a magnetic switch may be operatively (e.g., magnetically) coupled to a magnet or a magnetic portion of a door, such that movement of the door causes the sensor to indicate a change in door status. As another example, the detector device 104 may include a port configured to couple to an external sensor configured to sense a state of a door or a change in a state of a door (or other entry point). The sensor data (e.g., 730) may be used to activate the camera 534, as described with reference to FIG. 7.

Camera 534 includes one or more image sensors (e.g., a charge coupled device (CCD) and is configured to capture image data. Camera 534 may include or correspond to a digital camera in some implementations. Camera 534 is configured to capture an image, generate image data, responsive to one or more different indications and/or conditions. For example, in some implementations, camera 534 is configured to capture an image, generate image data, responsive to one or more indications generated based on sensor data from one or more sensors of the detector device 104, such as magnetic switches 516-519, sensors 532, etc. Additionally, or alternatively, camera 534 is configured to capture an image responsive to receiving an image capture command, such as from an input button (e.g., switch 509) on the housing 106 or the station 501, or from a remote device (e.g., 552 or 554). Additional details on the camera 534 and the operations thereof, are described further with reference to FIGS. 6 and 7.

Controller 510 is configured to execute instructions 522 to detect the release of the capture element 128 from the set position, activate an indicator device 408 responsive to detection of the release, or both. For example, circuitry 118 may detect release of capture element 128 based on activation or deactivation of switch 116. Additionally, or alternatively, in response to detection of the release of the capture element 128, controller 510 may initiate communication circuitry 526 to transmit message 556 indicating operation of trap 122. Communication circuitry 526 may transmit message 556 to server 552 or to device 554, such as a computer, tablet, phone, etc.

In a particular implementation, housing 106 is physically coupled to second switch 518 (e.g., a second magnetic switch) and circuitry 118 is further configured to detect operation of a second trap, such as a second rodent snap-trap, responsive to an operation of the second switch 518. Additionally, housing 106 may be physically coupled to third switch 519 (e.g., a third magnetic switch) and circuitry 118 is further configured to detect operation of a third trap (e.g., a third rodent snap-trap) responsive to an operation of third switch 519. In some implementations, switch 116 and second switch 518 are coupled in parallel to circuitry 118, such that circuitry 118 is configured to activate the indicator device 408 responsive to a first signal from switch 116, a second signal from second switch 518, or both. When detector device 104 includes multiple switches 116, 518, 519, controller 510 may be configured to activate the one or more indicator devices 408 to identify which trap had a detected operation. For example, each trap (e.g., each switch 116, 518, 519) may correspond to a different indicator or to a different indicator output.

In some implementations, controller 510 is configured to identify when an output of a sensor 532 satisfies a threshold and, in response, to initiate a communication (e.g., a message). For example, when sensor 532 is a power supply sensor, controller 510 may identify when power supply 530 is in a low power condition, such as when a battery needs to be changed or charged. As another example, when sensor 532 is a moisture sensor, controller 510 may identify when one or more traps are underwater and are in need of physical inspection. As another example, when sensor 532 is a vibration sensor, controller 510 may identify activation of a particular trap based on a signal of a corresponding switch indicating operation of the particular trap and based on the output of the vibration sensor being greater than or equal to a threshold during a particular time period associated with the controller 510 receiving the signal from the switch.

Thus, FIG. 5 describes a monitoring system of a pest-management apparatus that provides increased speed and ease of deployment and a reduction in time and manpower for identification of an operated pest-management apparatus and contents thereof, through live image updates. To illustrate, the monitoring system (e.g., the detector device 104) of the present disclosure provides a pest-management system with a "plug and play" component including one or more magnetic switches. Accordingly, a user can use the detector device 104 to form a multi-trap pest-management apparatus that includes individual trap operation detection and notification.

Figure 6:
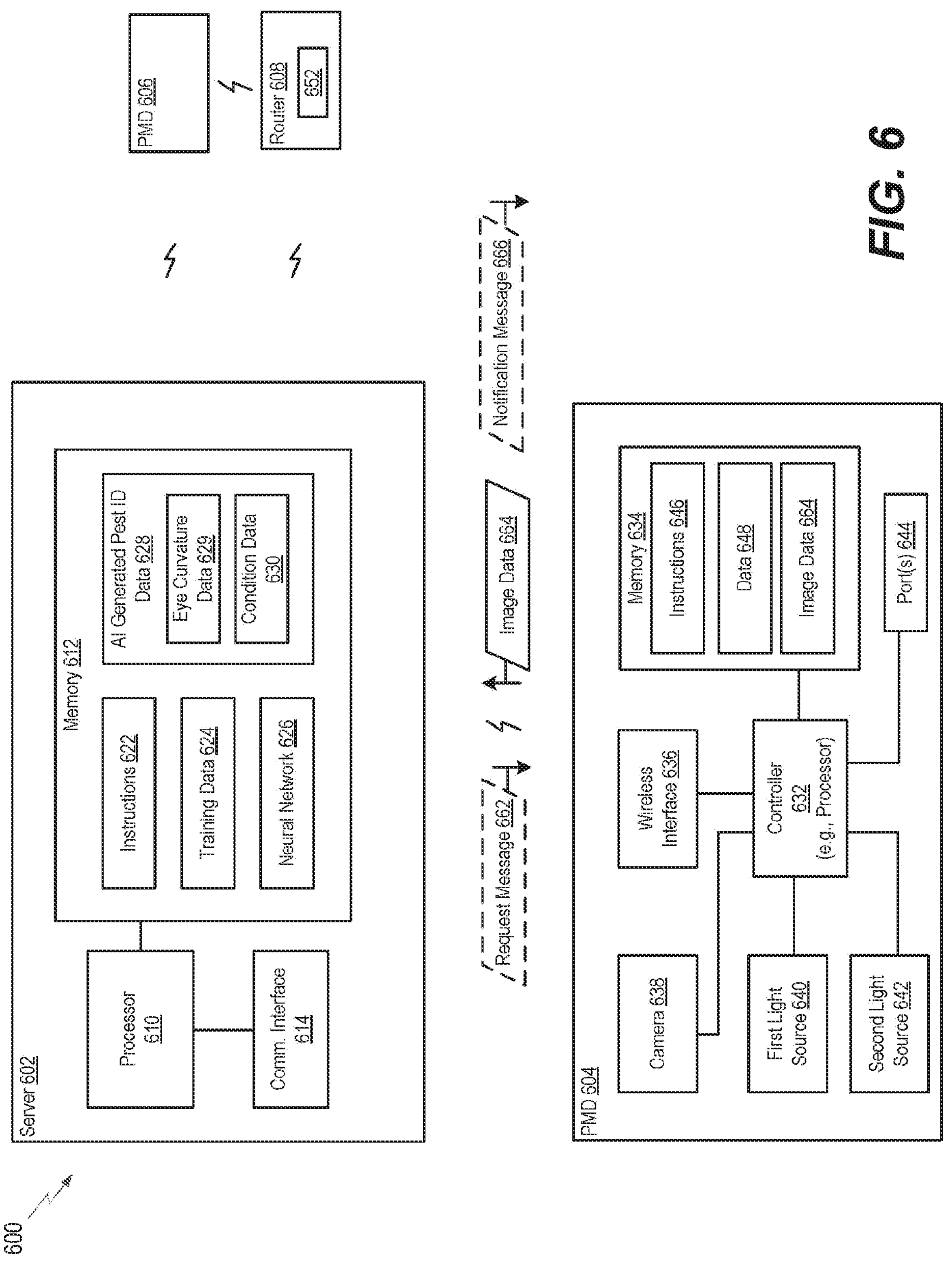
FIG. 6 is a block diagram that illustrates aspects of another illustrative pest-management system including a camera.

Referring to FIG. 6, a block diagram of an example 600 of an illustrative pest-management system is depicted that includes a server 602 and multiple pest-management stations (e.g., pest-management devices (PMDs) 604 and 606). Server 602 may include or correspond to server 552 of FIG. 5, and each of PMDs 604 and 604 may include or correspond to example 100 of FIG. 1, detector device 104, pest-management stations 501 of FIG. 5, or a combination thereof.

Server 602 includes a processor 610, a memory 612, and a communications interface 614 (e.g., wired interface, wireless interface, or both). Memory 612 is configured to store data, such as instructions 622, training data 624, neural network data 626, and AI generated pest identification data 628. Training data 624 (e.g., training sets) includes pest image database data and/or pest specification database data. Processor 610 generates a neural network (e.g., neural network data 626) based on processing the training data 624. Based on the neural network (e.g., neural network data 626) and the training data 624 (e.g., the processing thereof), AI generated pest identification data 628 can be derived which is based on and/or includes correlations identified by the neural network.

AI generated pest identification data 628 includes or corresponds to AI generated correlation data used to identify a pest or a property thereof. The AI generated pest identification data 628 may be in the form of tables, images, thresholds, formulas, or a combination thereof. In some implementations, AI generated pest identification data 628 may include eye curvature data 629, condition data 630, or both. To illustrate, eye curvature data 629 includes AI generated data on eye curvature of species and/or sex of pests such that image data can be analyzed to determine a species and/or sex of a pest or type of pest (e.g., species of rodent). Condition data 630 includes AI generated data on different weather (e.g., temperature and humidity) and lighting conditions such that corrections can be made for identifying pest in all conditions and using visible and/or infrared images.

First PMD 604 includes a controller 632, a memory 634, a wireless interface 636, a camera 638, a first light source 640, a second light source 642, and one or more ports 644. Components 632-638 may include or correspond to such corresponding components of pest-management station 501 of FIG. 5. The first light source 640 may include or correspond to a first type light source and the second light source 642 may include or correspond to a second type light source. For example, ultraviolet light, visible light and infrared light sources may be used. In a particular implementation, the first light source 640 and the second light source 642 include or correspond to a visible light source and an infrared light source. The one or more ports 644 may include or correspond to ports for one or more sensors of PMD 604 (e.g., detector device 104 thereof) and/or ports for one or more sensors couplable to PMD 604 (e.g., detector device 104 thereof).

First PMD 604 and second PMD 606 may be the same or different types of PMDs. To illustrate, such PMDs of system 600 may include different components and/or target different types of pests. Additionally, such devices may be located in different places, such as different places of the same location or in different locations entirely. The PMDs may communicate with the server directly or indirectly. To illustrate, the first PMD communicates 604 directly with the server 602 via a network (e.g., cellular network), while the second PMD 606 communicates with the server 602 via a router 608 via the network or another network (e.g., an internet network or a wired network), as illustrated in the example of FIG. 6. As another example, the second PMD 604 may communicate with the server 602 via the first PMD 604

For example, a PMD of system 600 may include a trap, such as trap 122, bait, or a combination thereof. A PMD of system 600 may include multiple traps and/or baits, and such traps and/or baits may include different types of traps and/or baits. When different types of traps and/or baits are used, the different types of traps and/or baits may target or be configured to catch or terminate (and optionally lure) different types of pests, such as insects, rodents, etc. At least one PMD of system 600 includes a detector device 104 having a housing 106.

First PMD 604 (e.g., detector device 104 thereof) is wirelessly coupled to server 602 (and optionally second PMD 606, such as a detector device thereof, and/or router 608) via a wired connection, a wireless connection, or both. Second PMD 606 is coupled to server 602 via router 608 (e.g., a wireless interface 652 thereof).

During operation, first PMD 604 captures an image using camera 638, i.e., generates image data 664. The image may correspond to an area external to the first PMD 604 or an area of an interior of the first PMD 604. First PMD 604 may use the first light source 640, the second light source 642, or both as flash devices based on conditions, such as lighting conditions and direction. For example, non-visible light, such as infrared light, may be used to image an area external to the first PMD 604 to not scare away incoming pests and/or at night. Visible light may be used to image an internal area, such as when capturing images of an interior or cavity of first PMD 604, because such images may provide higher quality images and identification of a pest already captured or of an empty trap. The image data 664 is sent to the server 602 for processing. The server 602 analyzes the image data 664 using AI generated pest identification data 628 and generates an indication, modifies the image data, generates a notification message 666 including the indication, updates the training data 624 with the image data, updates the neural network based on the image data, or a combination thereof.

In a particular implementation, the first PMD 604 generates the image data 664 responsive to a request, such as a request message 662 from server 602. Alternatively, the request message 662 is transmitted by another device (e.g., 708 of FIG. 7), such as a client device or mobile device (e.g., smartphone). The request message 662 may be a pull request. In other implementations, the first PMD 604 generates the image data 664 based on sensor data generated by or at first PMD 604, and "pushes" the image data 664 to server 602 independent of a request (e.g., 662), as described with reference to FIG. 5. For example, when trap 122 is activated, when a touch bar is triggered, when a sensor value exceeds a threshold level, expiration of a timer, etc. In a particular implementation, the camera 638 is activated based on sensor data from two or more sensors indicating a pest is in or near the first PMD 604.

Figure 7:
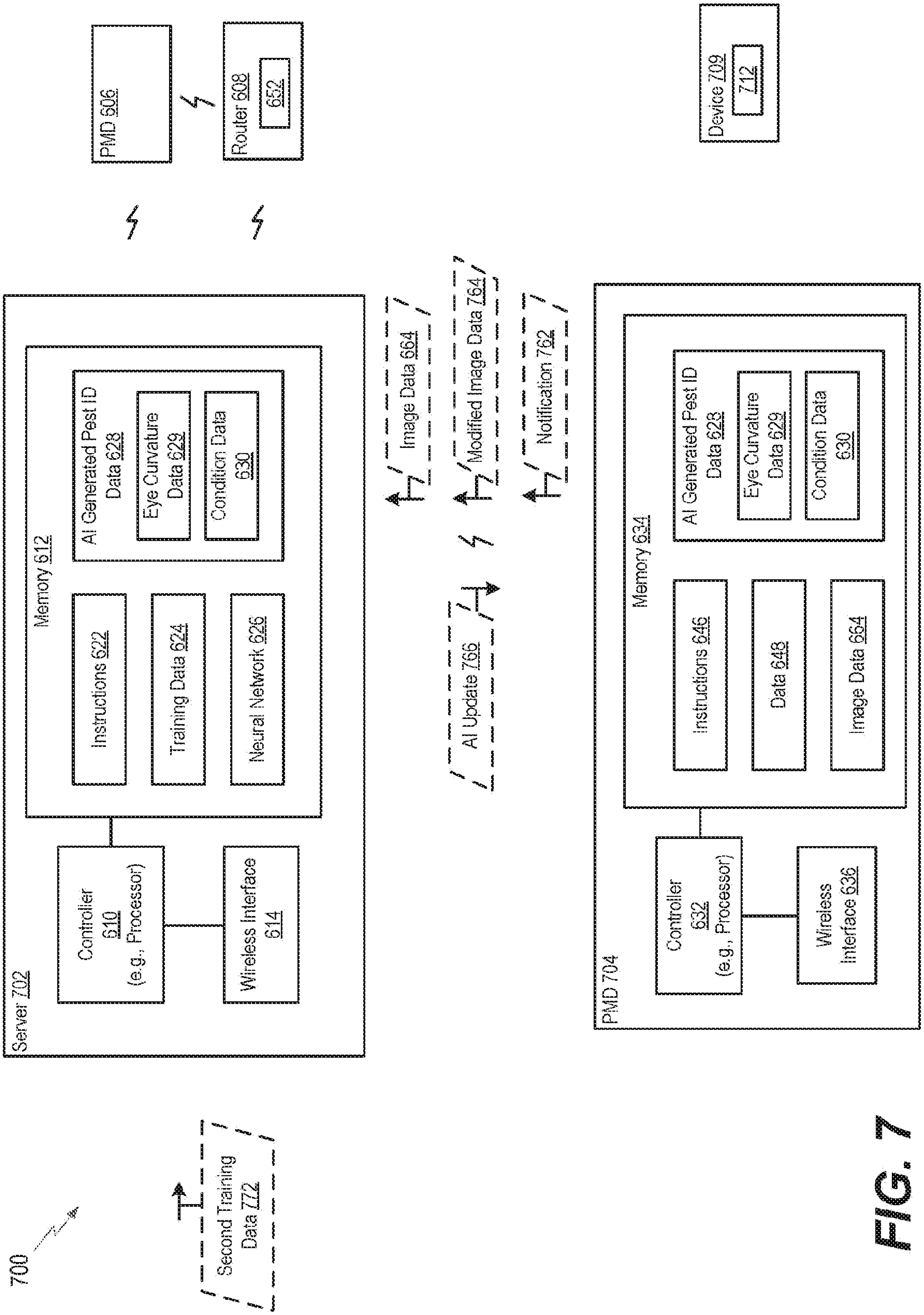
FIG. 7 is a block diagram that illustrates aspects of another illustrative pest-management system including a camera.

Referring to FIG. 7, a block diagram of an example 700 of an illustrative pest-management system is depicted that includes a server 602, multiple pest-management stations (e.g., pest-management devices (PMDs) 704 and 606), and a remote client device, device 709 (e.g., desktop computer or mobile phone). Server 602 may include or correspond to server 552 of FIG. 5, and each of PMDs 704 and 604 may include or correspond to example 100 of FIG. 1, detector device 104, pest-management stations 501 of FIG. 5, PMD 604 of FIG. 6, or a combination thereof. Device 709 include client application 712. Client application 712 is configured to interact (communicated, send instructions, receive updates, etc.) with server 602, one or more PMDs, or a combination thereof.

As compared to the pest-management system of example 600 of FIG. 6, where the server 602 performs AI generation and processing, the first PMD 704 (or another client device, such as 709) performs the AI based image processing. To illustrate, first PMD 704 additionally includes AI generated pest data 628, such as eye curvature data 629 and/or condition data 630 as compared to first PMD 604. Thus, in response to generating image data 664, first PMD 704 may analyze the image data 664. To illustrate, controller 632 may process the image data 664 according to AI generated pest data 628 or compare the image data 664 to the AI generated pest data 628. The first PMD 704 may transmit notification 762 based on the processing of the image data 664. The notification 762 may include an indication of a trap status, an identified pest, a change in status, an indication of a reset needed, or no change in status.

Additionally, or alternatively, modified or processed image data (modified image data 764), generated by AI processing of image data 664, may be sent to server 602, device 709, or both. Examples of modified or processed image data are illustrated and described with reference to FIGS. 19 and 20.

In some implementations, the image data 664 may be sent to the server 602 to update the AI training data and resulting algorithms and correlations. In some such implementation, the server 602 may transmit an AI update 766 to PMDs to update the memory 634 thereof.

Additionally, or alternatively to updating AI generated pest data 628 based on image data 664, server 602 may receive second training data 772 (e.g., updated training data). The server 602 may update the AI generated pest data 628 based on the second training data 772 in addition to or the alternative of image data 664 (e.g., images from PMDs).

In some implementations, a pest management system (e.g., 600 or 700) may further include AI generated timing data, such as timing data 730. Timing data 730 may be included as part of the AI generated pest identification data 628, as illustrated in FIG. 7, or may be separate from the AI generated pest identification data 628. Timing data 730 may be generated by the server 702, similar to data 629, 630 as described above. Timing data 730 may include or correspond to computer generated correlations indicating when to capture images based on image data (e.g., 664, 764), sensor data 768, or a combination thereof. Sensor data 768 may be generated based on one or more sensors of a PMD or coupled to a PMD, such as sensors 532, magnetic switches 115, 518, 519, etc. Timing data 730 may be transmitted and stored on a PMD in some implementations, as illustrated in FIG. 7. Timing data may be updated by an AI update 766. In other implementations, timing data 730 is stored at server 702, and server 702 generates image capture commands based on the timing data 730 and sends the commands to the PMDs.

To illustrate, sensor data 768 may be captured by a particular sensor (e.g., reed switch) and indicate when a door opens and/or closes. The opening and closing of the door may be a prime opportunity for a pest to enter into a building or monitored area. Accordingly, the sensor data 768 (e.g., opening and closing of the door) can be used to generate timing data 730; and timing data 730 generates image capture commands based on the correlations identified from the sensor data 768. For example, a monitoring device coupled to pest monitoring mount, as in FIGS. 9A-9F, may be activated to capture video of an area near the door responsive to a door opening or a particular time when the door is usually open (e.g., at 10:00 am for receiving deliveries) identified based on sensor data 768. As another example, a monitoring device of a pest management station may be activated to capture an image 30 minutes after the door is opened or closed, or 30 minutes after a period of time when the door is opened or closed (e.g., at 11:30 am, thirty minutes after the 10:00 am to 11:00 am delivery is completed and the door is closed).

As another illustration, image data which indicate positive results (e.g., a pest is present) may be used to identify which monitoring devices are candidates for increased monitoring and/or when to monitor or capture images. Additionally, or alternatively, image data which indicate negative results (e.g., no pests present) may be used to identify which monitoring devices are candidates for decreased monitoring and/or when to not monitor or capture images.

In the implementations of FIGS. 6 and 7, the camera, camera 638, may be configured to operate in one or more modes. The modes may include an on-demand mode, a timer based mode, a trigger based mode, or a combination thereof. The on-demand mode corresponds to a mode where a request, such as request 662, is received and camera 638 captures one or more images in response to the request, such as immediately or shortly after receiving the request or at some schedule time in the future indicated in the request. The timer based mode corresponds to a mode where the camera 638 captures one or more images responsive to the expiration of a timer or responsive to a timer condition being satisfied, e.g., 9:00 am. The trigger based mode corresponds to a mode where the camera 638 captures one or more images based on and responsive to sensor data 768. To illustrate, when the sensor data 768 of one or more sensors is compared to one or more corresponding thresholds and satisfies at least one of the thresholds, the camera 638 captures one or more images in response to the comparison/determination.

In some implementations, the camera 638 may operate in more than one mode at a time. For example, the camera 638 may be configured to capture images responsive to a timer and responsive to sensor based triggers. As another example, after activation of trap, such as 122, camera 638 may operate in a timer based mode (e.g., a keep alive mode) and an on-demand mode. To illustrate, every period (e.g., every x hours) an image is captured and images may also be capture responsive to a request.

In each of the above described modes, the camera 638 may capture images according to corresponding mode settings. To illustrate, when in a particular mode, the camera 638 captures images using camera settings that correspond to the particular mode the camera 638 is in. Mode settings (i.e., camera settings for a particular mode) may include amount of images to capture, image capture delay, type of flash used, flash delay, focus, shutter speed, image location (an area external to a PMD, an area of an interior of the PMD, or both), etc., or a combination thereof.

As a first illustrative, non-limiting example, trigger based modes may have a mode setting (camera mode setting) to use a first type of flash, such as visible light, a second type of flash, UV light, or both. Additionally, in some implementations, the mode settings may have multiple different settings for a given mode, i.e., sub-mode settings. One such example of a mode that may have sub-mode settings is the trigger based mode. To illustrate, when the camera 638 is activated based on a first sensor (e.g., a motion sensor indicates motion exterior to the PMD) the camera 638 captures an image of an area exterior of the PMD using a second type of flash, UV flash. As another illustration, when the camera 638 is activated based on a second sensor (e.g., a touch bar sensor indicates motion in an interior of the PMD) the camera 638 captures an image of the interior of the PMD using a first type of flash, visible light flash. Thus, the camera 638 can be operated based on the mode in which the camera 638 was activated and based on additional information relevant to the activation.

As a second illustrative, non-limiting example, timer based modes may have a camera mode setting to use a first type of flash, such as visible light. To illustrate, as the trap may already be activated in such modes (e.g., keep alive mode), a visible light flash may provide better illumination and image quality. Also, scaring a pest away may not be applicable in such situations.

As a third illustrative, non-limiting example, trigger based modes may have a camera mode setting to use a first type of flash, such as visible light. To illustrate, as a user may desire to see a status of a trap, a visible light flash may provide better illumination and image quality. Although examples of flash settings for camera mode settings are provided above, camera modes may have additional or other (alternative) settings that are determined based on camera mode.

In some implementations, the image data or modified image data is transmitted to the server by a PMD responsive to capture (e.g., soon or immediately after capture if a connection is active). In other implementations, the image data or modified image data is transmitted to the server responsive to preset or preconfigured update times.

Accordingly, FIGS. 6 and 7 enable remote visibility of the traps and/or surrounding are of a PMD and enhanced image capabilities, such as AI detection, redundant activation of the camera, on-demand and/or scheduled imaging. Thus, a workload of a technician in reduced because of the decrease in false positives and effectiveness of individual PMDs and the system increases from reduced PMD downtime.

Figure 8:
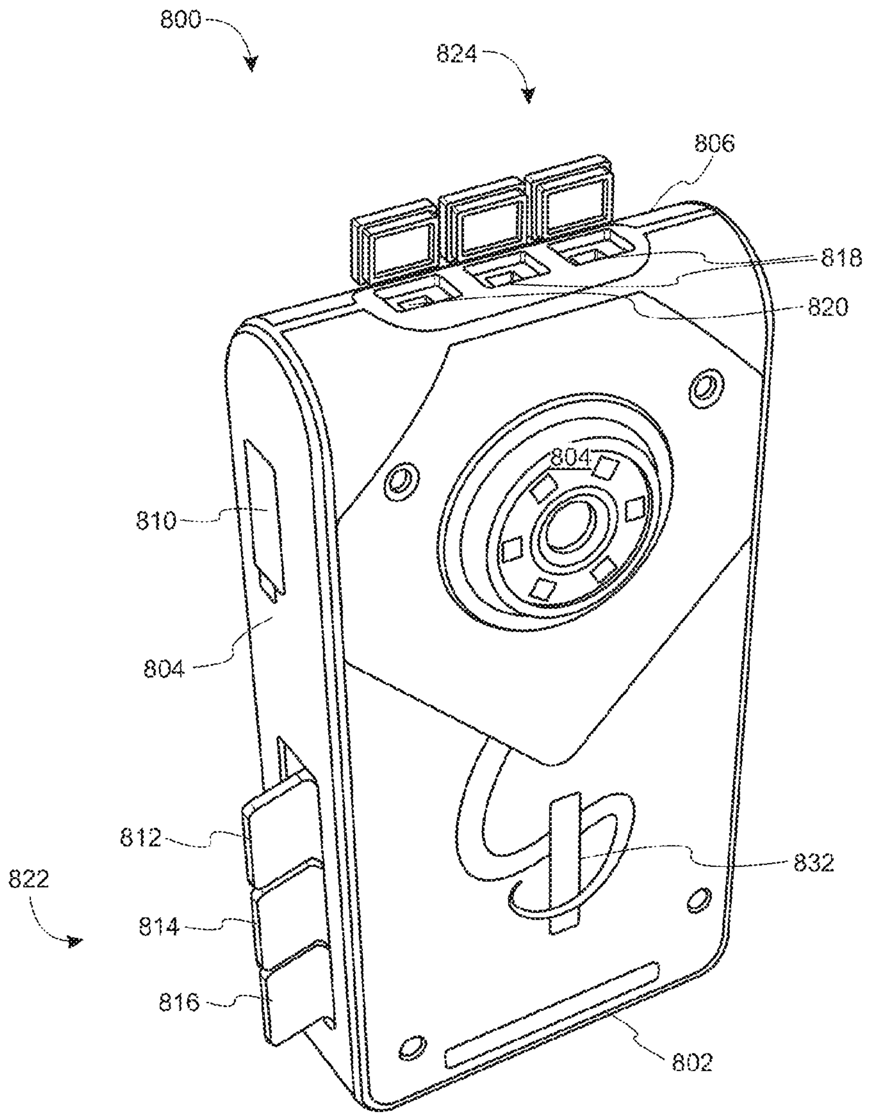
FIG. 8 is a diagram of an example of a detector device.

Referring to FIG. 8, a diagram of an example of detector device 800 is illustrated. In the example of FIG. 8, the detector device 800 includes a camera 804 integrated within a housing 802 of the detector device 800. The housing 802 further includes (e.g., defines) a plurality of ports 810-820 and 9. 810 includes or corresponds to charging port, such as a USB charging port for an internal and/or replaceable rechargeable battery. As illustrated in FIG. 8, a first set of ports 822 are included on a first side 806 of the housing 802 and a second set of ports 824 are included on a second side 808 of the housing 802. In the example of FIG. 8, the first set of ports 822 include a first PIR sensor port 812, a first reed sensor port 814, and a first touch sensor port 816. The second set of ports 824 include second and third reed sensor ports 818, and a second touch sensor port 820. In some implementations, detector device 800 further includes a reed sensor 832 in the housing 802. As illustrated in FIG. 8, the reed sensor 832 is in the front and lower, middle portion of the housing 802, although in other implementations, the reed sensor 832 can be in other positions. Similarly, the sensor ports 810-822 may be arranged differently to accommodate different mounting configurations and bait stations. By having multiple sensors and ports on multiple sides of the housing, the detector device 800 can better manage cables/wire and have increased reliability.

Figure 9A:
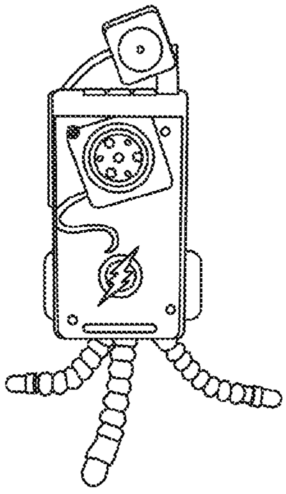
FIGS. 9A-9F illustrate pictures of various mounting configurations and mounts for detector devices.
Figure 9B:
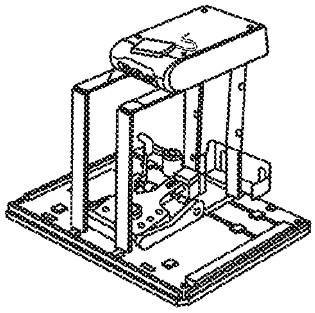
Figure 9C:
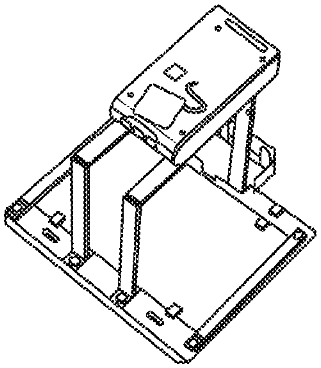
Figure 9D:
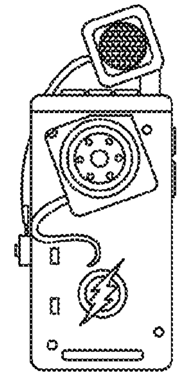
Figure 9E:
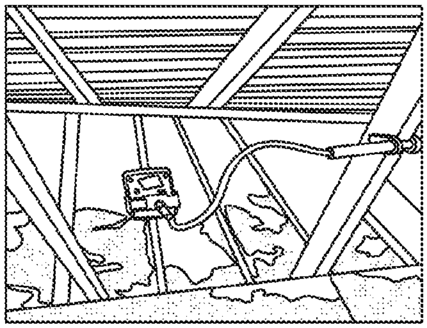
Figure 9F:
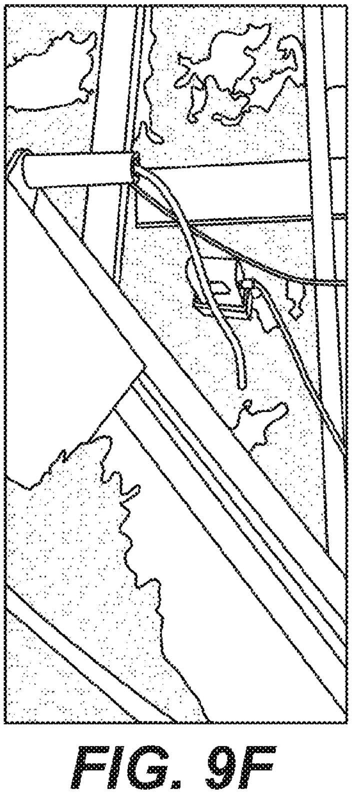

Referring to FIGS. 9A-9F, pictures of various mounting configurations and mounts (e.g., pest-management device or a pest monitoring mount) for a detector device are illustrated. FIG. 9A illustrates a detector device mounted on a stand. FIGS. 9B and 9C illustrate a detector device mounted on top of a platform and facing a trap thereof. In FIG. 9B, the trap is a snap-trap, and in FIG. 9C, the trap is an adhesive trap. FIG. 9D illustrates a wall mount configuration. FIGS. 9E and 9F illustrated clamp mounting arrangements. In FIGS. 9E and 9F, a clamp mount is illustrated which includes a clamp, a wire rod, and mounting bracket for coupling to the detector device. The wire rod is a flexible and repositionable, but rigid enough to hold the detector device in place in the absence of external forces. To illustrate, the wire rod can overcome or resist the force of gravity on itself and the detector device once set. In some implementations, the wire rod is extendable (e.g., comprises telescoping sections or excess length stored in a base thereof or the mounting bracket. Additional types of mounts and configurations may be used, such as a mount for a fly light (e.g., light based fly trap), or one of the above mounts may be coupled to or positioned proximate to a fly light. Accordingly, as illustrated by FIGS. 9A-9E, a single detector device can be mounted in many different ways to serve many different purposes and applications. Therefore, the detector device (e.g., monitoring device) can be reused and adapted to many use cases.

Figure 10:
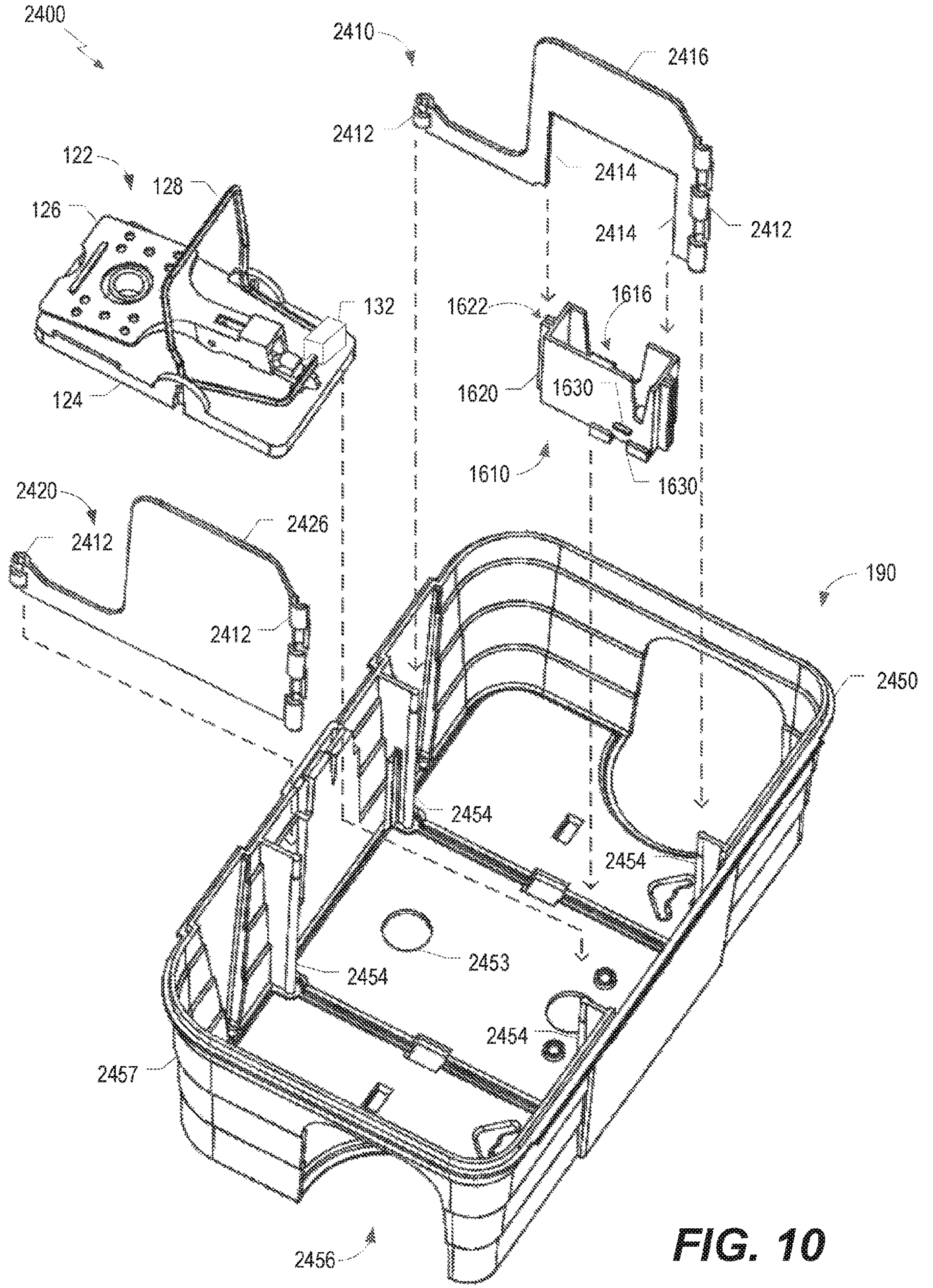
FIG. 10 is an assembly drawing of an example of a bait station associated with a pest-management system.

Referring to FIG. 10, an assembly drawing of an example 2400 of a station, such as a bait station, associated with a pest-management system is depicted. Example 2400 includes trap 122, separators 2410, 2420, holder 1610, and platform 190. In some implementations, trap 122 may be coupled to platform 190 of FIG. 10 via another platform (e.g., 190 of FIG. 1). It is noted that one or more components, such as detector device 104 and a lid of the station, have been omitted for ease of illustration and description.

Platform 190 includes a base portion (e.g., base 2450) and a lid portion (e.g., a lid—not shown). For example, the lid is movable relative to base 2450 to cover a chamber (e.g., an interior chamber) of platform 190. Base 2450 includes walls 2457 and posts 2454. Base 2450 also includes one or more openings 2456 to enable a pest, such as rodent, to enter an interior chamber of platform 190 when the lid is coupled to base 2450. Additionally, or alternatively, base 2450 includes a through hole 2453, which may include or correspond to through hole 175.

Separator 2420 includes wall portion 2426 and clips 2412. Separator 2410 includes wall portion 2416 and clips 2412. Clips 2412 are configured to be coupled to posts 2454 of base 2450. Wall portion 2416 includes edges 2414 that are spaced apart and configured to engage slots 1622 of holder 1610. It is noted that detector device 104 is to be coupled to holder 1610 (e.g., inserted into cavity 1616) prior to edges 2414 being engaged with slots 1622. In other implementations, holder 1610 may be replaced by detector device 104 that includes fins and slots (similar to fins 1620 and slots 1622) coupled to housing 106.

When holder 1610 (including detector device 104), separator 2410, trap 122, and separator 2420 are positioned in base 2450 and the lid is coupled to base 2450, separators 2410, 2420 guide a rodent that enters opening 2456 of platform 190 to capture portion 134 of trap 122. For example, referring to FIG. 11, an example 2500 of the station of FIG. 10 is depicted. In example 2500, edge 2414 is engaged with slot 1622 as indicted by arrow 2502. In example 2500, one or more components, such as separator 2420, have been omitted for ease of illustration and clarity. Example 2500 includes lid 2552 that is couplable with base 2450. Dashed line 2560 depicts a path that a rodent may travel within the chamber of the platform 190 after entering opening 2456.

Figure 11:
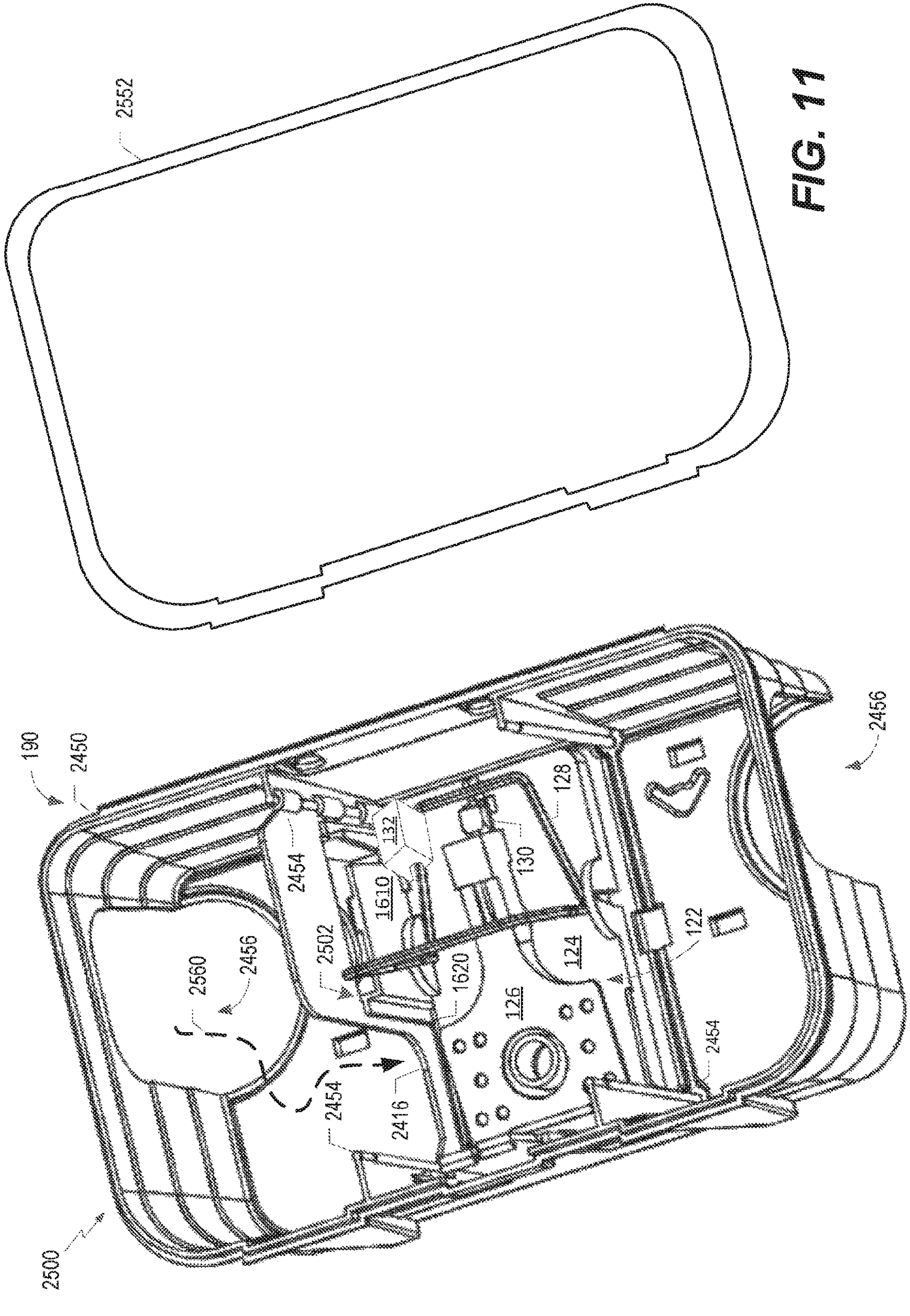
FIG. 11 is a diagram that illustrates an aspect of the bait station of FIG. 10.

Thus, FIGS. 10 and 11 describe a pest-management apparatus, such as a bait station, that provides increased speed and ease of deployment and a reduction in time and manpower for identification of an operated pest-management apparatus. To illustrate, components and devices of the pest-management apparatus are configured to be removably coupled from each other and, when coupled, enable proper function and interaction between different components. In this manner, the present disclosure provides a pest-management system with "plug and play" components that are individually replaceable in a case of a failure without having to discard the entire pest-management apparatus, thus resulting in cost saving. Additionally, the above-described aspects include a pest-management apparatus with no exposed wires that can degrade or deteriorate because of environmental conditions or that can be chewed on and damaged by a pest.

Figure 12A:
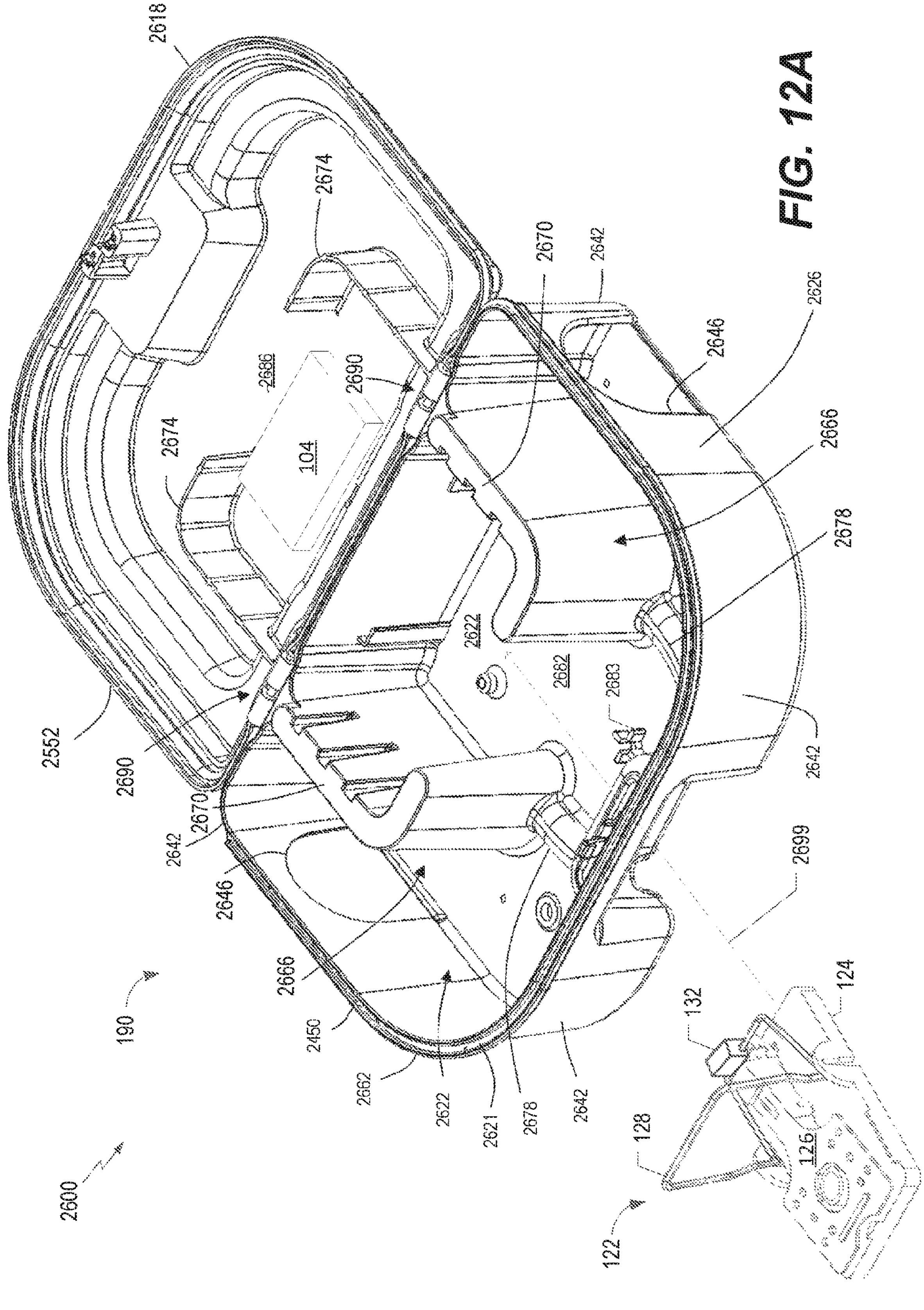
FIG. 12A is a diagram that illustrates an isometric view of another example of a bait station.

Referring to FIG. 12A, an example 2600 of a pest-management apparatus is depicted that includes detector device 104, trap 122, and platform 190. In FIG. 12, platform 190 is configured as a station, such as a bait station, that includes base 2450 and lid 2552. Base 2450 and lid 2552 are configured to be coupled together such that lid 2552 is movable (e.g., including removable) relative to base 2450 between an open position and a closed position in which base 2450 and lid 2552 cooperate to define a chamber 2622. Each of base 2450 and lid 2552 may be separately molded from a suitable (e.g., plastic) material. In other implementations, the base and lid may be integrally formed from a suitable (e.g., plastic) material. Trap 122 may be positioned within chamber 2622 (e.g., a subchamber 2682) of platform 190 as indicated by dashed arrow 2699. In some implementations, trap 122 may be coupled to platform 190 of FIG. 12 via another platform (e.g., 190 of FIG. 1).

As shown, base 2450 includes a sidewall 2626 that defines an external perimeter of the station. Sidewall 2626 of base 2450 includes corner portions 2642 across which the sidewall may change direction. Corner portions 2642 may include any appropriate shape (e.g., to guide a rodent exterior to base 2450 toward opening(s) 2646). For example, one or more corner portions 2642 may be curved or flat. As shown, at least one corner portion 2642 (e.g., two corner portions closest to lid 2552) includes a first radius of curvature and at least one other corner portion (e.g., two corner portions opposite lid 2552) includes a second radius of curvature greater than the first radius of curvature.

Base 2450 includes one or more interior walls 2666 (e.g., two interior walls 2666, each extending substantially vertically from a floor and toward a top of base 2450. At least one of interior wall(s) 2666 is configured to prevent a rodent from climbing over the interior wall when lid 2552 is in the closed position. For example, at least one of interior wall(s) 2666 includes an upper surface 2670 configured to contact lid 2552 (e.g., one or more ridges 2674 thereof) when the lid is in the closed position. Lip 2662 of sidewall 2626 may be configured to engage at least a portion of lid 2552.

Base 2450 includes one or more interior protrusions 2678, such as ridges (e.g., two protrusions 2678, as shown) that each extend from floor and toward a top of base 2450. When lid 2552 is in the closed position, interior wall(s) 2646 and protrusion(s) 2678 may cooperate with the lid to define subchamber 2682 within chamber 2622. Protrusion(s) 2678 are located such that, when lid 2552 is in the closed position, at least a portion of chamber 24622 is accessible by passing over at least one of the protrusion(s) 2678. For example, one or more protrusions 2678 each extend between sidewall 2626 and an interior wall 2666 such that, for example, when lid 2552 is in the closed position, access to subchamber 2682 is possible by passing over one of the protrusion(s). As shown, one or more protrusions 2678 each include a height (e.g., extending in a direction perpendicular to floor) that is selected to allow a rodent to climb over the protrusion when lid 2552 is in the closed position, but to inhibit liquids from reaching at least a portion of chamber 2622, such as, for example, subchamber 2682.

Lid 2552 includes one or more ridges 2674 (e.g., two ridges 2674, as shown), each extending from an inner surface 2686 of lid 2552. When lid 2552 is in the closed position, each ridge 2674 is configured to contact a respective interior wall 2666 (e.g., upper surface 2670) of base 2450 such that, for example, the ridge(s) and interior wall(s) cooperate to define subchamber 2682. In at least this way, when lid 2552 is in the closed position, inner surface 2686, or a portion thereof, of the lid may be spaced apart from base 2450 by one or more ridges 2674, thereby providing for an increased volume within chamber 2622. In some implementations, such ridge(s) (e.g., 2674) may be configured to increase a stiffness of lid 2552.

As shown, lid 2552 is configured to be coupled to base 2450 via one or more hinges 2690 (e.g., two hinges 2690, as shown). For example, each hinge 2690 includes a hinge pin and one or more hooks, where the hinge pin is configured to be pivotally received within an interior channel of each of the hook(s). In other implementations, lid 2552 may be coupled to a base 2450 in any suitable fashion, such as, for example, being slidably coupled to the base, removably (e.g., detachably) coupled to the base (e.g., without hinges 2690), and/or the like.

At least one opening 2646 (e.g., two openings 2646, as shown) is configured to permit a rodent exterior to the apparatus to enter chamber 2622. As shown, each opening 2646 is defined by base 2450 alone (e.g., the entire outer perimeter of the entrance or opening is defined by the base); however, in other implementations, one or more openings 2646 may be defined by base 2450 and lid 2552, when the lid is in a closed position, and/or by the lid alone.

Lid 2552 includes a lip 2618 extending from (e.g., substantially all of or all of) a periphery thereof and configured to be received by base 2450 when the lid is in the closed position. More particularly, lip 2618 is configured to be received by a groove 2621 of base 2450, which may be defined by lip 2662. Lip 2618 may be configured to be closely or tightly received by groove 2621 such that, for example, an outer-most face of the lip is immediately adjacent or is in contact with an inner face of the groove (e.g., which may frustrate or prevent insertion of an implement between the lip and the groove in an attempt to pry lid 2552 from the closed position). When lid 2552 is in the closed position, access to subchamber 2682 through opening (s) 2646 using a human hand or implement is inhibited. To illustrate, subchamber 2682 is not visible through opening(s) 2646, and direct access to the subchamber through each opening is obstructed by a respective interior wall 2666.

Trap 122 may be included in subchamber 2682 as indicated by arrow 2699. In some implementations, base 2450 includes a fastener 2683 (e.g., a clip) configured to couple trap 122 to holder 1610. For example, fastener 2683 may be configured to be inserted into channel 136 of trap 122. Detector device 104 is coupled to inner surface 2686 of lid 2552 such that switch 116 included in detector device 104 is configured to detect operation of trap 122 based on magnet 132.

Thus, FIG. 12A describes a pest-management apparatus, such as a bait station, that provides increased speed and ease of deployment and a reduction in time and manpower for identification of an operated pest-management apparatus. To illustrate, components and devices of the pest-management apparatus are configured to be removably coupled from each other and, when coupled, enable proper function and interaction between different components. Additionally, the pest-management apparatus includes no exposed wires that can degrade or deteriorate because of environmental conditions or that can be chewed on and damaged by a pest.

Figure 12C:
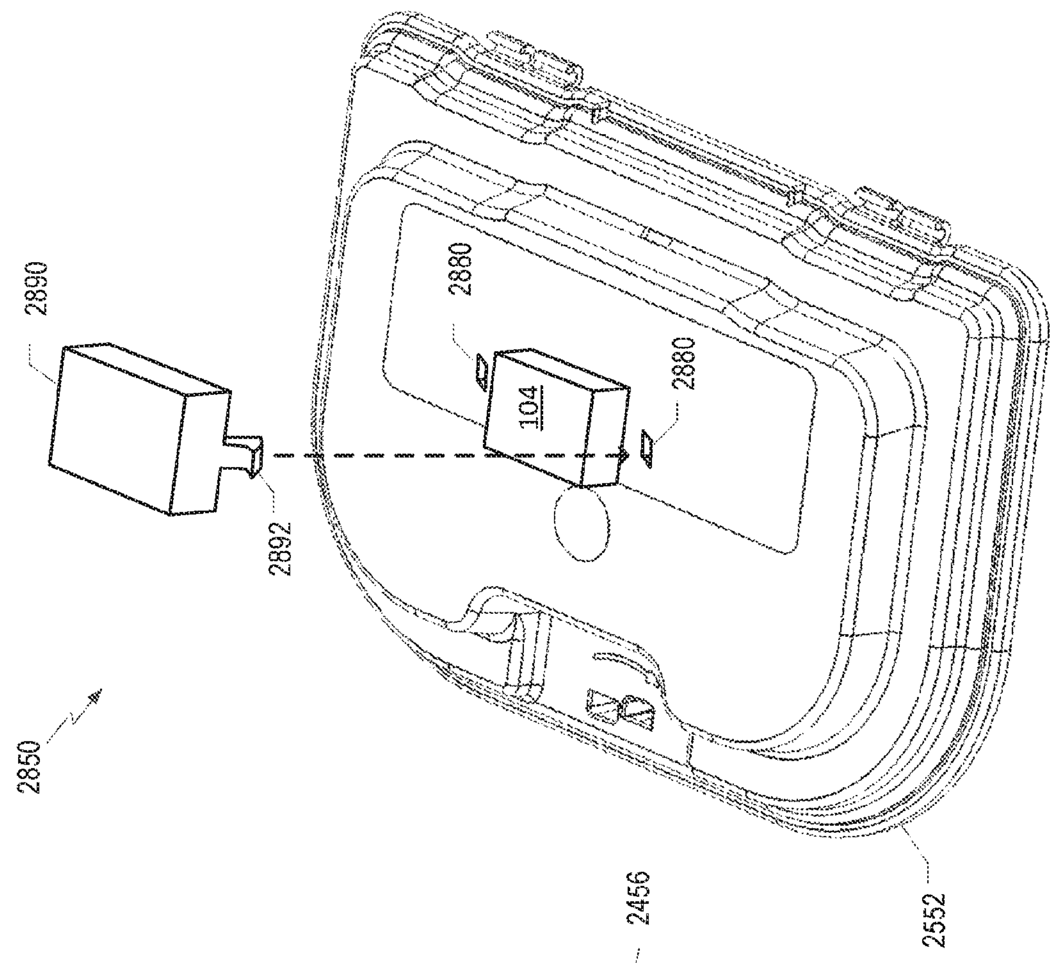
FIG. 12C is a diagram that illustrates a perspective view of an illustrative lid of the bait station of FIG. 12B.
Figure 12B:
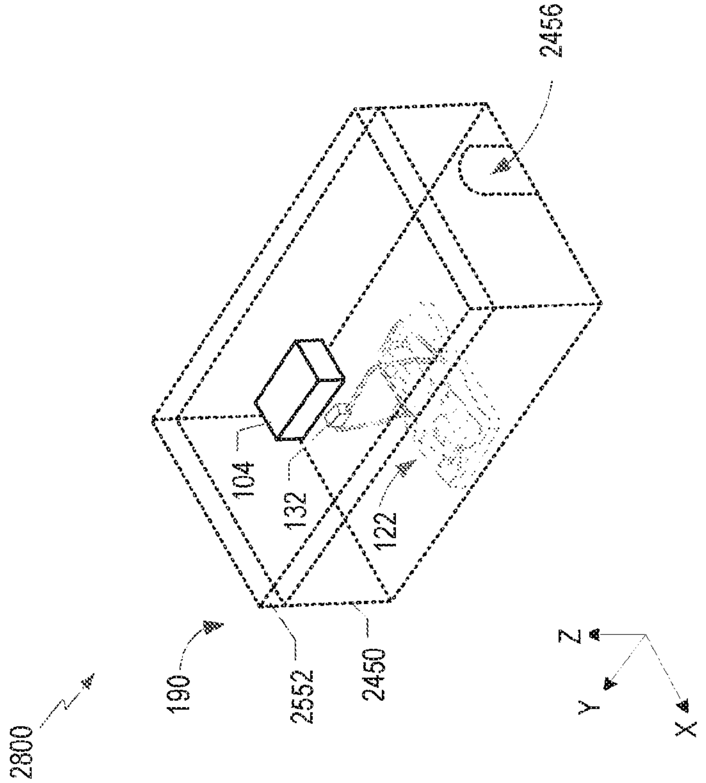
FIG. 12B is a diagram that illustrates another example of a bait station.

Referring to FIGS. 12B-12C, FIG. 12B depicts an example 2800 of a pest-management apparatus (e.g., a bait station), and FIG. 12C depicts an example 2850 of an illustrative lid 2552 of the station of FIG. 12B. Referring to FIG. 12B, example 2800 includes platform 190, detector device 104, and trap 122. In FIG. 12B, platform 190 is depicted as dashed lines for ease of explanation of one or more aspects of the pest-management apparatus. Platform 190 is configured as a station, such as a bait station, that includes base 2450, lid 2552, and opening 2456. In example 2800, detector device 104 is coupled to lid 2552 and positioned above trap 122. For example, base 124 of trap 122 may be associated with a plane, such as an x-y plane, and detector device 104 may be positioned in a z-direction with respect to trap 122 in the x-y plane. In some implementations, detector device 104 is positioned on lid 2552, as described with reference to FIG. 12C. In other implementations, detector device 104 is incorporated in lid 2552.

Trap 122 includes magnet 132 positioned such that, when capture element 128 is in the set position or when capture element 128 is released from the set position, a magnetic field of magnet 132 changes a state of switch 116 included in detector device 104. In some implementations, trap 122 may be coupled to platform 190 of FIG. 12B via another platform (e.g., 190 of FIG. 1).

Referring to FIG. 12C, detector device 104 is coupled to an exterior surface of lid 2552. Lid 2552 includes openings 2880 configured to receive tabs 2892 (e.g., connectors) of a cover 2890. Cover 2890 may be placed over detector device 104 such that detector device 104 is positioned between lid 2552 and cover 2890. To illustrate, tabs 2892 may be inserted into openings 2880 to couple cover 2890 to lid 2552, thus positioning detector device 104 with respect to trap 122 included in an interior chamber of platform 190 (e.g., base 2450 and lid 2552). Thus, FIGS. 12B and 12C describe an alternative pest-management apparatus as compared to FIGS. 10-12A. The pest-management apparatus of FIGS. 12B and 12C advantageously includes at least the benefits described above with reference to FIGS. 10-12A.

Figure 13:
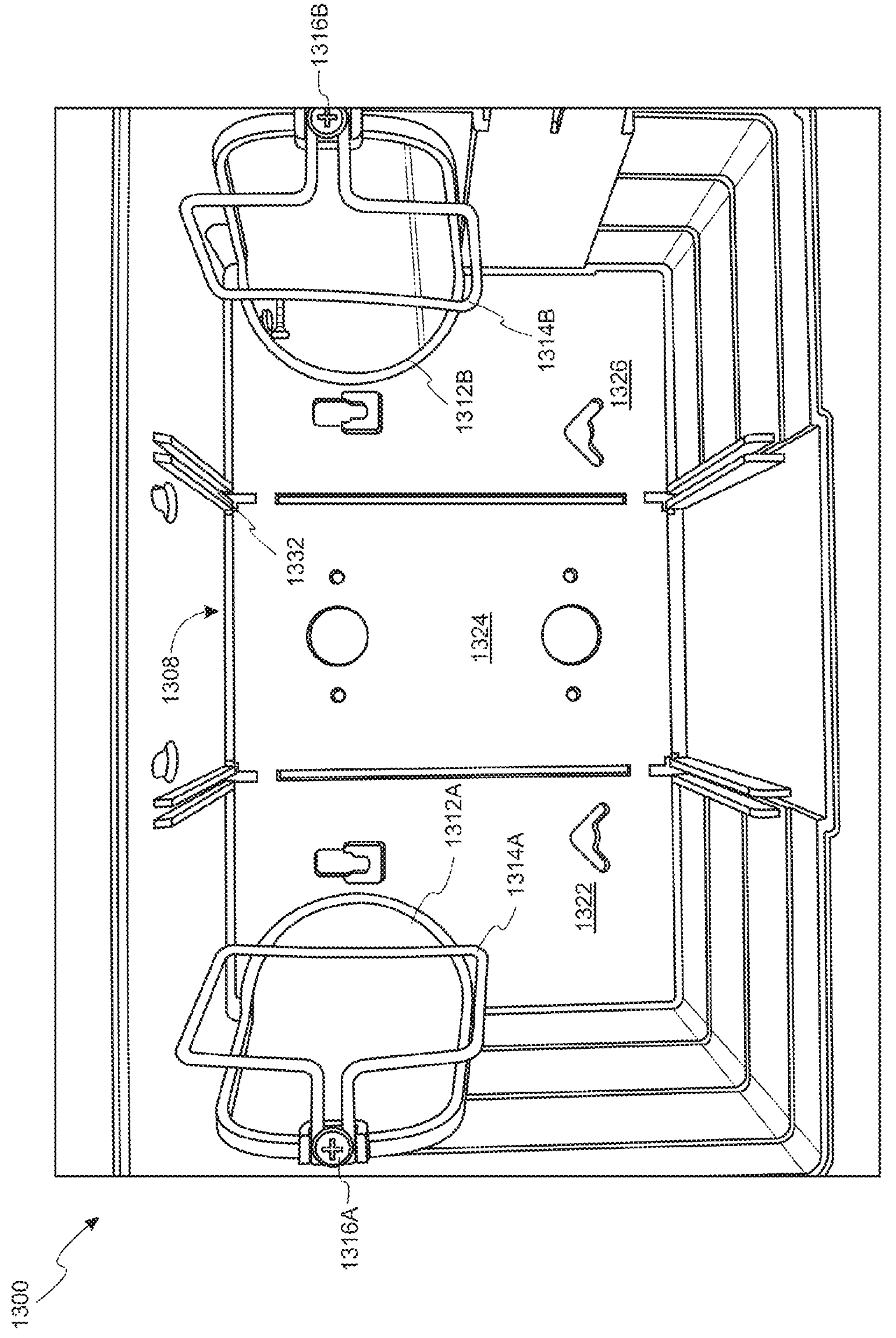
FIG. 13 illustrates an image of a bottom portion of another example of a pest-management apparatus.
Figure 14A:
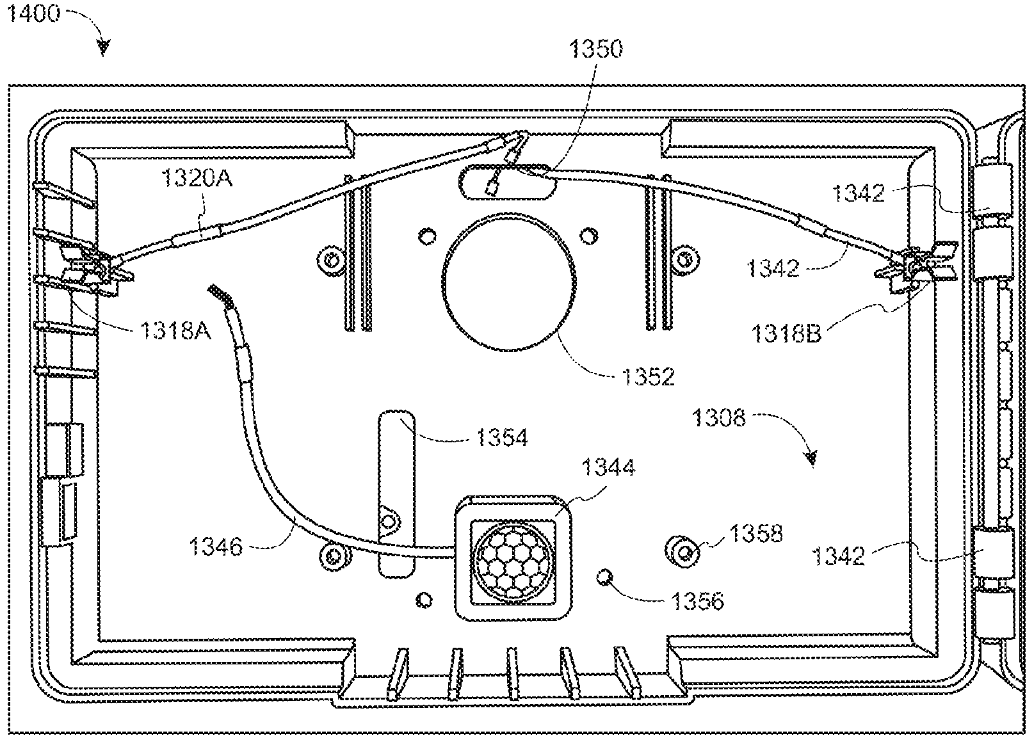
FIG. 14A illustrates an image of a top portion of the pest-management apparatus of FIG. 13.
Figure 14B:
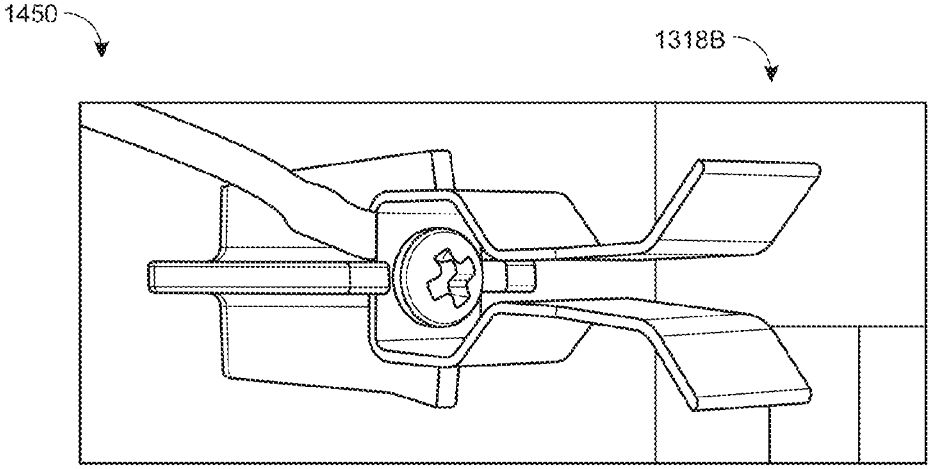
FIG. 14B illustrates an image of an expanded view of a contact of the top portion shown in FIG. 14A.
Figure 15:
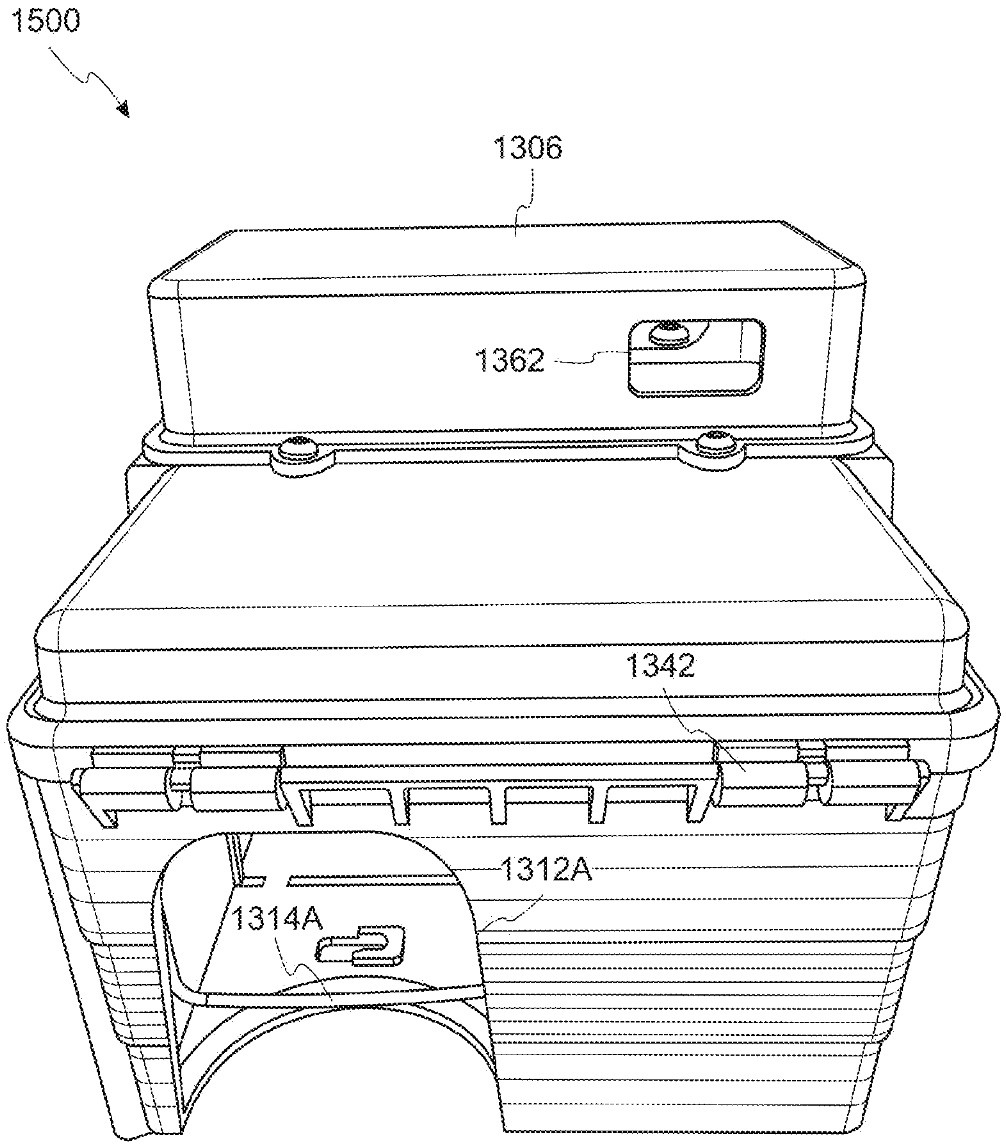
FIG. 15 illustrates an image of the pest-management apparatus of FIG. 13 in a closed position.
Figure 16:
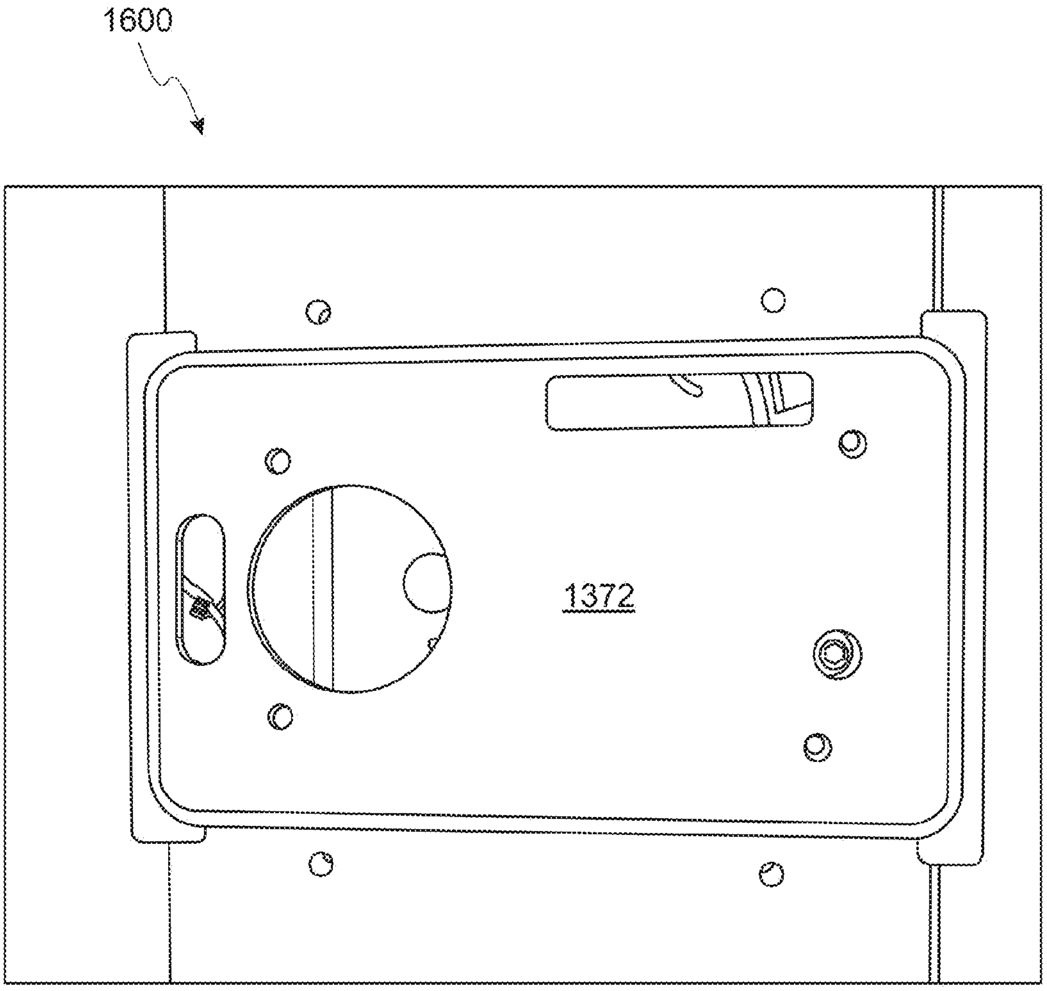
FIG. 16 illustrates an image of an interior of the cavity the pest-management apparatus of FIG. 13.
Figure 17:
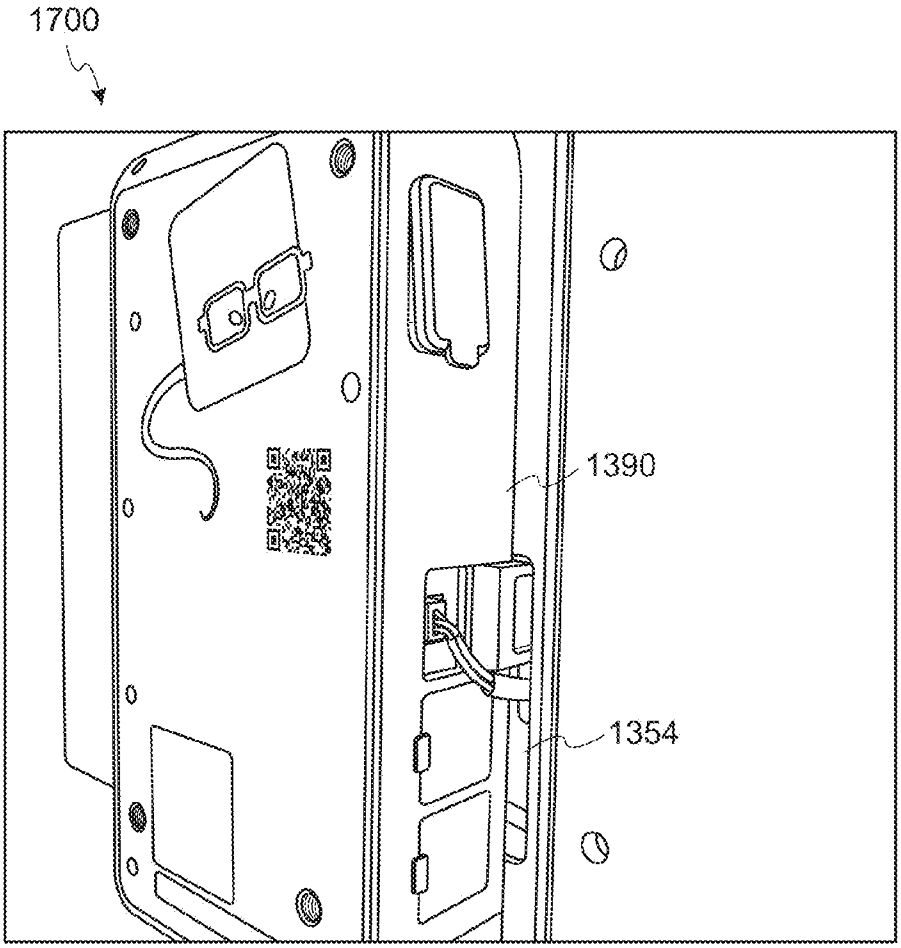
FIGS. 17 and 18 each illustrate an image of a detector device coupled to a top of the pest-management apparatus of FIG. 13.
Figure 18:
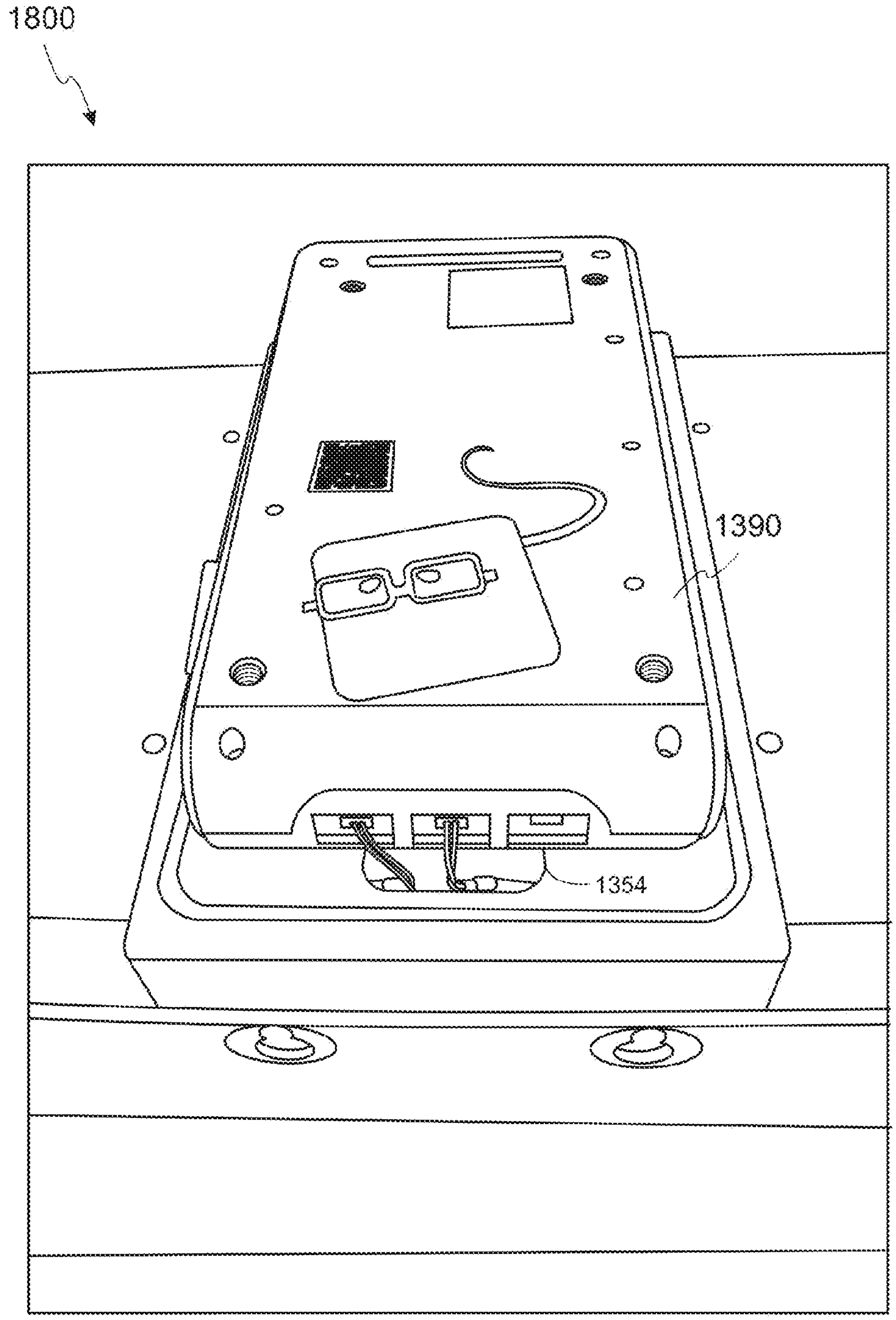

Referring to FIGS. 13-18, images of another example of a pest-management apparatus (e.g., a bait station) are illustrated. FIG. 13 illustrates a base or bottom portion of the pest-management apparatus, FIG. 14A illustrates a top or lid portion of the pest-management apparatus, FIG. 14B illustrates an expanded view of a contact of the top of FIG. 14A, FIG. 15 illustrates the pest-management apparatus in a closed position, FIG. 16 illustrates the interior of the cavity (e.g., second or exterior cavity) of the top, and FIGS. 17 and 18 illustrate a detector device coupled to the top.

Referring to FIG. 13, an image of a base 1302 (e.g., bottom) of a pest-management apparatus 1300 is illustrated. In the example of FIG. 13, the base 1302 includes two openings 1312A, 1312B and two corresponding bars 1314A, 1314B. Each bar 1314A, 1314B has a corresponding contact 1316A, 1316B. The contacts 1316A and 1316B are configured to contact corresponding contacts of a top 1304 (e.g., lid) of pest-management apparatus 1300, as illustrated and described with reference to FIGS. 14A and 14B, when the pest-management apparatus 1300 is closed and defines cavity 1308.

The base 1302 (e.g., cavity 1308 thereof) further includes multiple areas 1322-1326, which can be separated or divided (at least partially) by dividers (not shown). The dividers can be coupled to base 1302 via slots 1332. The areas 1322-1326 can include traps or other equipment depending on a desired configuration of the pest-management apparatus 1300.

Referring to FIG. 14A, an image of a top 1304 of pest-management apparatus 1300 is illustrated. In the example of FIG. 4, the top 1304 includes hinges 1342 to couple top 1304 to base 1302 and to facilitate opening and closing of the pest-management apparatus 1300. Top 1304 includes corresponding second contacts 1318A, 1318B. Second contacts 1318A, 1318B are configured to be in contact (e.g., physical and/or electrical contact) with corresponding contacts 1316A, 1316B when the top 1304 is on the base 1302 and/or when the pest-management apparatus 1300 is closed or defines cavity 1308. Each of second contacts 1318A, 1318B has a corresponding wire, 1320A, 1320B. Wires 1320A, 1320B are configured to be coupled to detector device to couple bars 1314A, 1314B to detector device, such as to enable a touch sensor or a reed sensor to detect activity (touch or motion) at the openings 1312A, 1312B.

Top 1304 further includes a light source 1344, and a corresponding wire 1346. Light source 1344 may include or correspond to first light source 640, second light source 642, or both. The top 1304 may define one or more openings or apertures, such as 1350-1358. Such apertures (e.g., 1350-1358) may be used for coupling devices, such as screws (e.g., 1356, 1358), as a window (e.g., 1352, such as a camera window), and as wire/cable routing openings (e.g., 1350, 1354), to facilitate coupling components inside a cavity of the pest-management apparatus 1300 to the detector device. In this example, the detector device is not positioned with the cavity 1308 (e.g., internal cavity). Rather, the detector device is positioned in an external cavity defined by the top 1304 alone, or the top 1304 and corresponding covering thereof (e.g., 1306), as illustrated in FIG. 15.

Referring to FIG. 14B, an expanded view of second contact 1318B is illustrated. Second contact 1318B is configured to make physical and electrical contact with corresponding contact 1316B of the base 1302, when closed, such that electricity/signals can be communicated between bar 1314B and detector device (e.g., a reed sensor thereof). As illustrated in the example of FIG. 14B, second contact 1318B includes two prongs and the shape of second contact 1318B is configured to partially surround corresponding contact 1316B of the base 1302. Because wires/cables are only partially used in conjunction with fixed components (conductors such as contacts and second contact 1316A-1318B), the electrical paths between detector device and bars 1314A, 1314B (e.g., touch bars) are more resilient to interference and damage, such as from rodent teeth or claws. Accordingly, touch bar sensors and reed sensors of a detector device will generate less false positives and false negatives, as compared to other designs, such as all wire/cable designs or designs with wire and cables near a trap. Additionally, the wires can be made shorter, or near exact length and excess wire need not be included to enable the top 1304 to be removed or opened from the base 1302 as in conventional pest-management apparatus designs.

Referring to FIG. 15, an image of a side view of the pest-management apparatus 1300 is illustrated. In FIG. 15, the top 1304 is in the closed position and is coupled to the base 1302 via the hinge 1342. The pest-management apparatus 1300 further includes a covering 1306 coupled to a top surface of the top 1304. The covering 1306 and top 1304 define a second cavity, which is configured to receive a detector device. For example, the cavity is sized to receive the detector device and is separate from the cavity 1308 (e.g., main or internal cavity) to protect the detector device therefrom. The covering 1306 may also include one or more apertures or through holes. As illustrated in the example of FIG. 15, the covering 1306 includes an aperture 1362. Such an aperture may enable access to the detector device, such as button, an indicator, and/or a port thereof. Accordingly, as compared to other bait station designs which place the detector device and/or the more sensitive electronics in the bait station (e.g., a cavity defined thereby), the pest-management apparatus 1300 provides a protected separate compartment from the main compartment which is designed to be protected from pests.

Referring to FIG. 16, another image of a top 1304 of pest-management apparatus 1300 is illustrated. As compared to FIG. 14A, which illustrates in a bottom or inside out view of top 1304, FIG. 16 illustrates a top view or outside in view of top 1304 while top 1304 is in the closed position. FIG. 16 depicts area 1372 which corresponds to an area covered by covering 1306 and corresponds to the cavity defined by the covering 1306 and the top 1304.

FIGS. 17 and 18 depict a detector device 1390, (e.g., detector device 800) attached to the top 1304 in area 1372 of FIG. 16. Referring to FIG. 17, a side view of detector device 1390 coupled to top 1304 is illustrated. In FIG. 17, a sensor (e.g., a PIR sensor) of the detector device 1390 is coupled to a wire via the aperture 1354. Referring to FIG. 18, another side view of detector device 1390 coupled to top 1304 is illustrated. In FIG. 17, additional sensors of the detector device 1390 are coupled to a wire via the aperture 1350.

Figure 19:
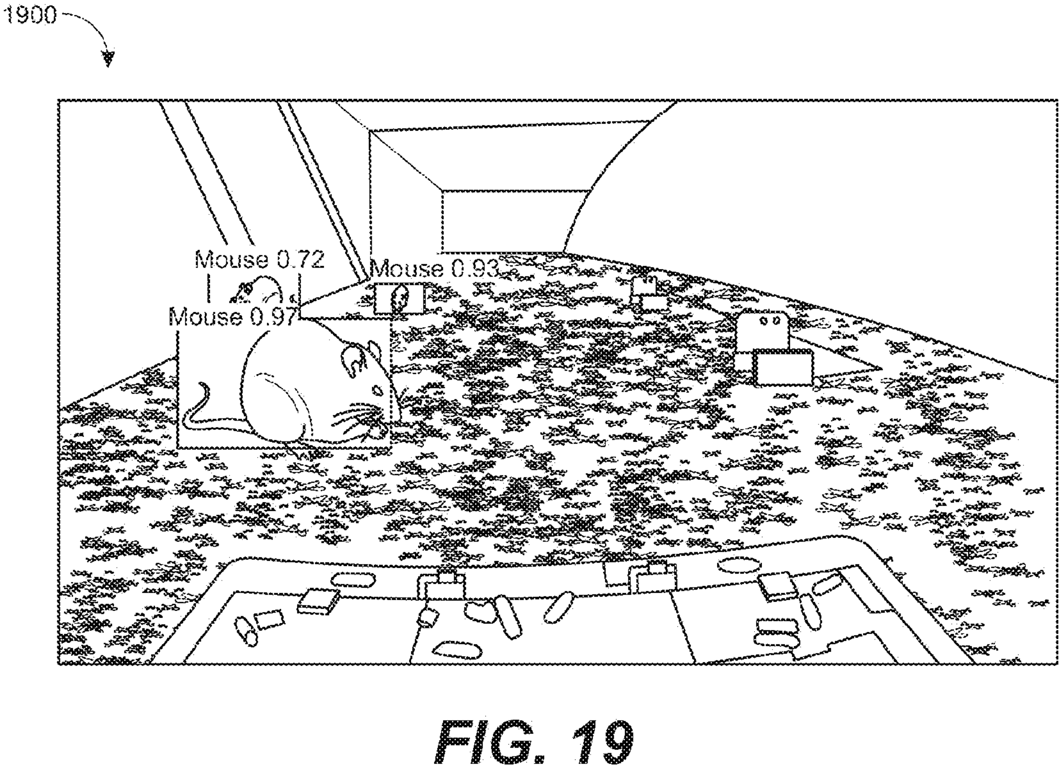
FIG. 19 is an image that that illustrates an example of an image captured and modified by a pest-management system.
Figure 20:
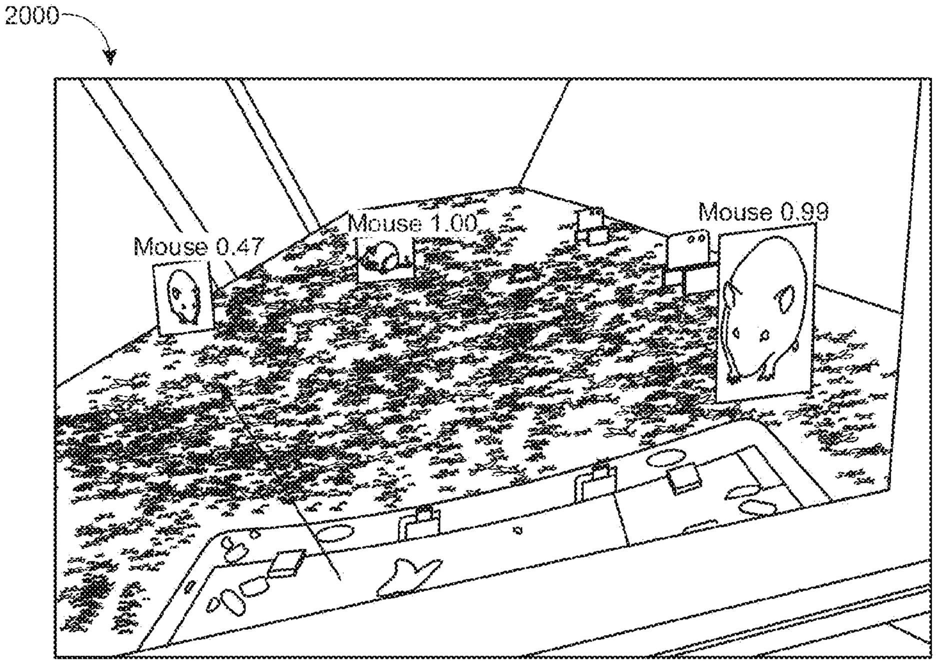
FIG. 20 is an image that that illustrates another example of an image captured and modified by a pest-management system.

FIGS. 19 and 20 depict illustrative images of a display corresponding to display data generated by a detector device or a server, as described above, and based on image date captured by a camera of the detector device. Referring to FIG. 19, an image captured by the camera of the detector device has been processed and modified to included pest identification data. To illustrate, the pest identification data includes data which identifies the individual pests, such as a pest ID number, pest size (e.g., length, height, etc.), pest weight, pest type, pest sub-type (e.g., rodent species type), pest gender, etc. In the example of FIG. 19, the image has been modified with rectangles to highlight areas where individual pests have been detected and the image has been modified to include text which indicates a size and type of the pest.

Referring to FIG. 20, a second image captured by the camera of the detector device has been processed and modified to included second pest identification data. Similar to the image in FIG. 19, the image in FIG. 20 has been modified with rectangles to highlight areas where individual pests have been detected and the image has been modified to include text which indicates a size and type of the pest. The arrow indicates that a pest was identified even though the image does not shown or clearly show a pest in the far left rectangle. Such a pest was identified via a second image (IR image) and based on second image data (IR image data).

Although FIGS. 19 and 20 depicts images, the results of the analysis of the image data can include images, text, or both. Such results may be sent via one or more methods, text, email, file transfer, etc., as described with reference to FIGS. 5-7.

Figure 21:
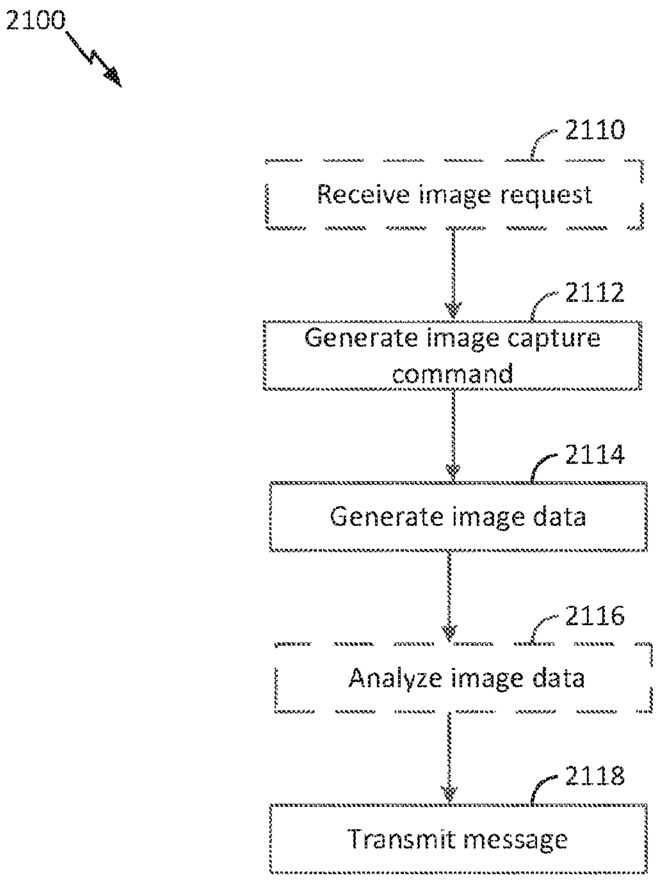
FIG. 21 is a flow diagram of an example of a method of operation of a device of a pest-management system.

Referring to FIG. 21, an example 2100 of a method of operation of a detector device is shown. For example, the detector device may include or correspond to detector device 104. The method 2100 may be executed by server 552, device 554, and/or detector device 104, such as controller 510.

The method 2100 may include receiving an image request, at 2110, and includes generating an image capture command, at 2112. For example, the controller 510 or 632 generates a command to activate the camera 534, 638 responsive to receiving an image request. In some implementations, the image request is generated locally and/or received from a component of the detector device 104. To illustrate, a button may be pressed on the detector device or sensor data may be compared to thresholds to generate the image request and/or image capture command. In other implementations, the image request is received from another device, such as a server and/or client device, such as 552, 602, 709, or a combination thereof.

The method 2100 further includes generating image data, at 2114, and may include analyzing the image data, at 2116. For example, the camera captures an image and generates image data. In some implementations, the detector device 104 includes AI software and processes the image data 664 to generate modified image data 764.

The method 2100 includes transmitting a message, the message generated based on the image data, at 2118. The message may include or correspond to one or more of the messages described with reference to FIGS. 5-7. For example, the message may be an update message, a notification message, include raw image data, processed image data, or a combination thereof. The message may be sent to one or more devices, such as a device who sent the image request, a device who relayed or forwarded the image request. Such devices may include the server 552, 602, the device 709, or both.

Thus, the method 2100 describes operation of the detector device. To illustrate, the detector device of a pest-management apparatus may be configured to provide an indication of a status of the detector device and/or an indication of operation of a trap. Additionally, the method 2100 may enable increased speed and ease of deployment of a pest-management apparatus and a reduction in time and man-power to identify pest-management apparatuses that have operated.

Figure 22:
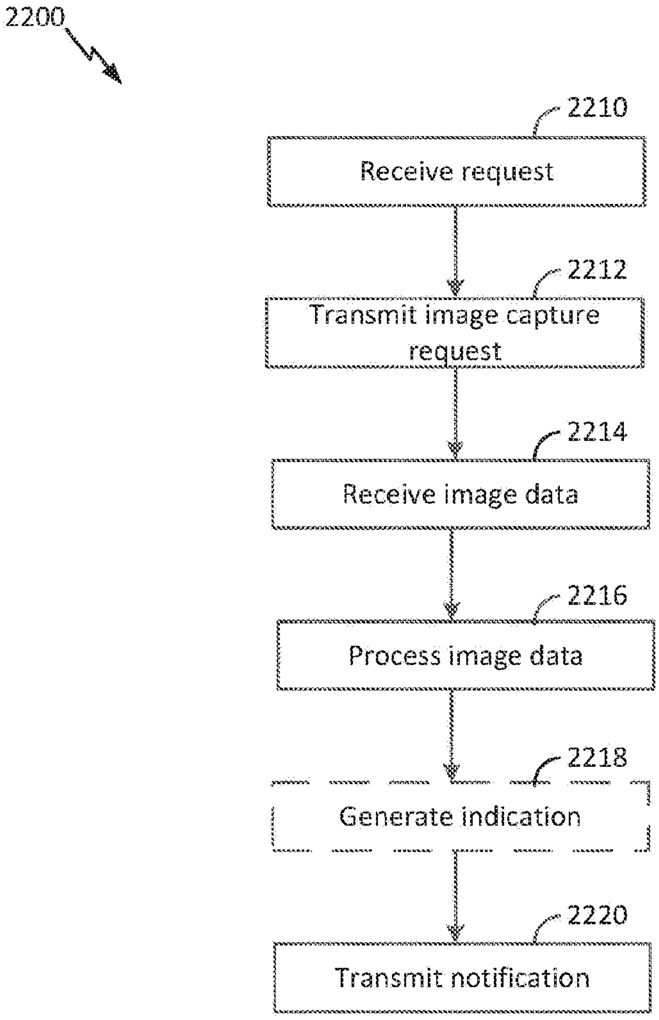
FIG. 22 is a flow diagram of an example of a method of operation of a server of a pest-management system.

Referring to FIG. 22, an example 2200 of a method of operation of a server of a pest-management system is shown. For example, the server may include or correspond to server 552 and/or server 602. The method 2200 may be executed by server 552, device 554, device 709, and/or a processor/controller thereof.

The method 2200 may include receiving a request message, at 2210, and includes transmitting an image capture request message, at 2212. For example, the server 602, using processor 610, initiates sending of a request message 662 to a PMD (e.g., first PMD 604) via communication interface 614. In some implementations, the processor 610 may receive an activation message from a timer or from another device, such as device 709 and generates and transmits the request message responsive thereto.

The method 2200 further includes receiving image data, at 2214, and processes the image data, at 2116. For example, the server 602 received image data 664 and/or modified image data 764 from the PMD and processes the image data 664, the modified image data 764, or both. To illustrate, the server 602 processes the image data 664 using AI generated pest ID data 628. As another illustration, the server 602 updates the AI generated pest ID data 628 based on the raw data.

The method 2200 may include generating an indication, at 2218. For example, the server 602 processes the modified image data 764 to generate an notification or indication of a pest, indication of no pest, indication of a service for the PMD (e.g., reset the trap), or a combination thereof. The method 2200 includes transmitting a notification, at 2220. For example, the server 602 sends a notification message to a client device, such as 709, and/or a device from which it received the request at 2210. The notification may include the modified image data 764, the indication, or both.

Thus, the method 2200 describes operation of the detector device. To illustrate, the detector device of a pest-management apparatus may be configured to provide an indication of a status of the detector device and/or an indication of operation of a trap. Additionally, the method 2200 may enable increased speed and ease of deployment of a pest-management apparatus and a reduction in time and man-power to identify pest-management apparatuses that have operated.

Figure 23:
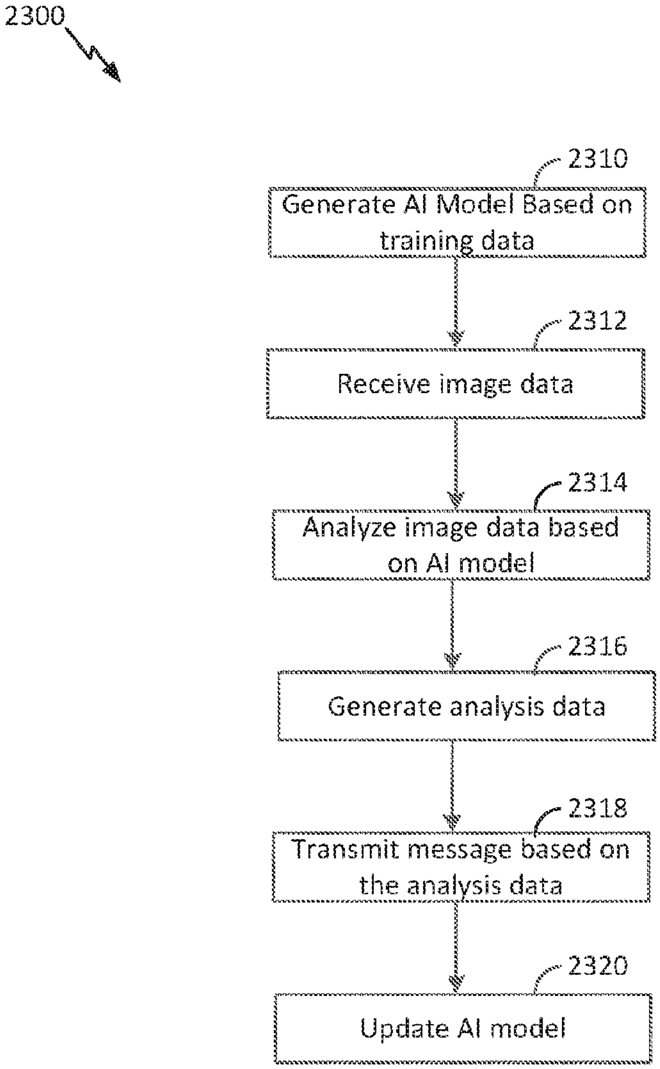
FIG. 23 is a flow diagram of an example of a method of operation for artificial intelligence based pest identification.

Referring to FIG. 23, an example 2300 of a method of operation for AI based pest identification is shown. The method 2300 may be executed by server 552, server 602, device 554, device 709, and/or detector device 104, such as controller 510 or 632.

The method 2300 may include generating AI model data based on training data, at 2310, and receiving image data, at 2312, as described with reference to FIGS. 6 and 7.

The method 2300 may further include analyzing the image data, at 2314, as described with reference to FIGS. 6 and 7. The method 2300 may include generating analysis data, at 2316. For example, an indication or modified image data may be generated based on image data 664, as described with reference to FIGS. 6 and 7.

The method 2300 may also include transmitting a message based on the analysis data, as described with reference to FIGS. 6 and 7. Optionally, the method 2300 includes updating the AI model, at 2322, in some implementations. For example, the AI data (e.g., 624-628) may be updated based on updated or additional training sets and/or image data from devices of the pest-management system, as described with reference to FIGS. 6 and 7.

Thus, the method 2300 describes operation of the detector device. To illustrate, the detector device of a pest-management apparatus may be configured to provide an indication of a status of the detector device and/or an indication of operation of a trap. Additionally, the method 2300 may enable increased speed and ease of deployment of a pest-management apparatus and a reduction in time and man-power to identify pest-management apparatuses that have operated.

The above specification and examples provide a complete description of the structure and use of illustrative embodiments. Although certain aspects have been described above with a certain degree of particularity, or with reference to one or more individual examples, those skilled in the art could make numerous alterations to aspects of the present disclosure without departing from the scope of the present disclosure. As such, the various illustrative examples of the methods and systems are not intended to be limited to the particular forms disclosed. Rather, they include all modifications and alternatives falling within the scope of the claims, and implementations other than the ones shown may include some or all of the features of the depicted examples. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one example or may relate to several examples. Accordingly, no single implementation described herein should be construed as limiting and implementations of the disclosure may be suitably combined without departing from the teachings of the disclosure.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims. The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A monitoring device for a pest-management device, the monitoring device comprising:

a camera configured to capture image data;

a plurality of sensors configured to couple to a pest station, the plurality of sensors including at least one of a reed switch, a touch sensor, or a motion sensor; a transceiver configured to wirelessly transmit data;

artificial intelligence (AI) based pest identification software;

a memory storing AI generated pest identification data including rodent eye curvature data; and a processor coupled to the memory, the processor configured to activate the camera based on sensor data from one or more sensors of the plurality of sensors, and responsive to a determination that a timer condition is satisfied, to cause the camera to capture rodent eye curvature image and generate rodent eye curvature image data, wherein the timer condition is based on timing data generated using the sensor data; and wherein the processor is configured to identify rodents based on the AI based pest identification software, and wherein the AI based pest identification software is configured to identify rodent species, rodent gender, a particular rodent, or a combination thereof, based on a comparison of the rodent eye curvature data to the rodent eye curvature image data.

2. The monitoring device of claim 1, wherein the pest-management device comprises a pest-management station, and wherein the monitoring device is configured to be coupled to the pest-management station such that the camera is positioned to capture images of an environment exterior to the pest-management station, to capture images of an interior portion of the pest-management station, or both.

3. The monitoring device of claim 1, further comprising one or more first light sources.

4. The monitoring device of claim 3, further comprising one or more second light sources, the second light sources different from the first light source, wherein the first light source comprises a visible light LED, and wherein the second light source comprises an infrared LED.

5. The monitoring device of claim 4, wherein:

the processor is configured to capture a first image in a first mode, wherein the first mode is a visible light mode; and the processor is configured to capture a second image in a second mode, wherein the second mode is an infrared mode.

6. The monitoring device of claim 5, wherein the processor is configured to activate the first light source as a flash prior to capturing the first image, and wherein the processor configured to activate the second light source as a flash prior to capturing the second image.

7. The monitoring device of claim 6, wherein the processor is configured to activate the first light source, the second light source, or both, such that the corresponding light source generates a series of multiple flashes prior to capturing an image.

8. The monitoring device of claim 1, wherein the touch sensor, the motion sensor, or both, are passive infrared (PIR) sensors.

9. The monitoring device of claim 1, wherein the AI based pest identification software is configured to compensate for weather conditions, lighting conditions, angle, orientation of the pest, distance, or a combination thereof.

10. The monitoring device of claim 1, further comprising a plurality of sensor ports, wherein the plurality of sensors ports include a reed switch port, a touch sensor port, and a motion sensor port.

11. The monitoring device of claim 1, further comprising a battery;

a charging port;

a storage device; and a storage port.

12. The monitoring device of claim 1, wherein the processor is configured to: compare sensor data from one or more sensors of the plurality of sensors to one or more corresponding thresholds;

determine, based on one or more comparisons of the sensor data to the one or more corresponding thresholds, whether to initiate activation of the camera; and responsive to a determination to activate the camera, cause the camera to capture an image using a visible light flash, an infrared light flash, or both.

13. The monitoring device of claim 1, wherein the processor is configured to: responsive to a determination that a timer has expired cause the camera to capture the image using a visible light flash.

14. The monitoring device of claim 1, wherein the processor is configured to: responsive to receiving an image capture request from a server, a client device, or both, cause the camera to capture an image using a visible light flash.

15. The monitoring device of claim 1, wherein the pest-management device comprises a pest monitoring mount, wherein the monitoring device is configured to be coupled to the pest monitoring mount, and wherein the monitoring mount comprises a stand, a platform, a wall mount, a clamp mount, or a fly light mount.

16. The monitoring device of claim 1, wherein the processor is configured to cause the camera to capture multiple images, and wherein the AI based pest identification software is configured to identify the rodents based on the multiple images.

17. The monitoring device of claim 1, wherein the timing data generated using the sensor data comprises a time period.

18. The monitoring device of claim 1, wherein the sensor data comprises detection of a movement of a door adjacent the monitoring device.

19. The monitoring device of claim 18, wherein the timing data generated using the sensor data comprises a delay period.

20. The monitoring device of claim 1, wherein the processor is configured to cause the camera to capture an image (1) responsive to a determination that a timer condition is satisfied, wherein the timer condition is based on timing data generated using the sensor data, and (2) responsive to an image capture command transmittable by an activation switch of the monitoring device and by a remote device comprising a mobile device.

21. The monitoring device of claim 1, wherein the timer condition is satisfied when the timing data generated using the sensor data comprises an instance of opening of a door or an instance of closing of a door, as detected by the plurality of sensors.

22. The monitoring device of claim 1, wherein the timer condition is satisfied when the timing data generated using the sensor data comprises an instance of opening of a door during a first time period or an instance of closing of a door during a second time period, as detected by the plurality of sensors.

23. A monitoring device for a pest-management device, the monitoring device comprising:

a camera configured to capture image data;

a plurality of sensors configured to couple to a pest station, the plurality of sensors including at least one of a reed switch, a touch sensor, or a motion sensor;

a transceiver configured to wirelessly transmit data;

one or more first light sources;

one or more second light sources, the second light sources different from the first light source, wherein the one or more first light sources comprises a visible light LED, wherein the one or more second light sources comprises an infrared LED, wherein the visible light LED is arranged to be used to image an internal area of the pest-management device, and wherein the infrared LED is arranged to be used to image an external area of the pest-management device;

a memory; and a processor coupled to the memory, the processor configured to: activate the camera based on sensor data from one or more sensors of the plurality of sensors, and responsive to a determination that a timer condition is satisfied, cause the camera to capture an image, wherein the timer condition is based on timing data generated using the sensor data.

24. The monitoring device of claim 23, wherein the processor is configured to activate the camera in response to an image capture command.

25. The monitoring device of claim 24, wherein the image capture command is transmitted by an activation switch of the monitoring device, a remote device, or a combination thereof.

26. The monitoring device of claim 25, wherein the remote device comprises a mobile device.

27. The monitoring device of claim 23, wherein the timing data generated using the sensor data comprises a time period.

28. The monitoring device of claim 23, wherein the sensor data comprises detection of a movement of a door adjacent the monitoring device.

29. The monitoring device of claim 28, wherein the timing data generated using the sensor data comprises a delay period.

* * * * *